(12) United States Patent
Hadar et al.

(10) Patent No.: US 11,907,407 B2
(45) Date of Patent: *Feb. 20, 2024

(54) GENERATING ATTACK GRAPHS IN AGILE SECURITY PLATFORMS

(71) Applicant: Accenture Global Solutions Limited, Dublin (IE)

(72) Inventors: Eitan Hadar, Nesher (IL); Amin Hassanzadeh, Arlington, VA (US); Anup Nayak, Potomac, MD (US)

(73) Assignee: Accenture Global Solutions Limited, Dublin (IE)

( * ) Notice: Subject to any disclaimer, the term of this patent is extended or adjusted under 35 U.S.C. 154(b) by 134 days.

This patent is subject to a terminal disclaimer.

(21) Appl. No.: 17/644,503

(22) Filed: Dec. 15, 2021

(65) Prior Publication Data

US 2022/0129590 A1    Apr. 28, 2022

Related U.S. Application Data

(63) Continuation of application No. 16/556,380, filed on Aug. 30, 2019, now Pat. No. 11,232,235.

(Continued)

(51) Int. Cl.
*G06F 21/70* (2013.01)
*H04L 9/40* (2022.01)
(Continued)

(52) U.S. Cl.
CPC .......... *G06F 21/70* (2013.01); *G06F 16/9024* (2019.01); *G06F 21/577* (2013.01);
(Continued)

(58) Field of Classification Search
CPC .... G06F 21/70; G06F 16/9024; G06F 21/577; G06F 2221/034; H04L 41/14;
(Continued)

(56) References Cited

U.S. PATENT DOCUMENTS

| 5,521,910 A | 5/1996 | Matthews |
| 6,279,113 B1 | 8/2001 | Vaidya |

(Continued)

FOREIGN PATENT DOCUMENTS

| EP | 1559008 | 8/2005 |
| EP | 1768043 | 3/2007 |

(Continued)

OTHER PUBLICATIONS

Almeida et al., "An ontological analysis of the notion of community in the RM-ODP enterprise language," Computer Standards & Interfaces, Mar. 2013, 35(3):257-268.

(Continued)

*Primary Examiner* — Meng Li
(74) *Attorney, Agent, or Firm* — Fish & Richardson P.C.

(57) ABSTRACT

Implementations of the present disclosure include providing a graph representative of a network, a set of nodes representing respective assets, each edge representing one or more lateral paths between assets, the graph data including configurations affecting at least one impact that has an effect on an asset, determining multiple sets of fixes for configurations, each fix having a cost associated therewith, incorporating fix data of the sets of fixes into the graph, defining a set of fixes including one or more fixes from the multiple sets of fixes by defining an optimization problem that identifies one or more impacts that are to be nullified and executing resolving the optimization problem to define the set of fixes, each fix in the set of fixes being associated with a respective configuration in the graph, and scheduling performance of each fix in the set of fixes based on one or more operational constraints.

20 Claims, 8 Drawing Sheets

Related U.S. Application Data

(60) Provisional application No. 62/829,696, filed on Apr. 5, 2019, provisional application No. 62/774,516, filed on Dec. 3, 2018.

(51) Int. Cl.

| | |
|---|---|
| *G06F 16/901* | (2019.01) |
| *H04L 41/14* | (2022.01) |
| *H04L 43/026* | (2022.01) |
| *G06F 21/57* | (2013.01) |
| *G06Q 10/0631* | (2023.01) |

(52) U.S. Cl.
CPC ............ *H04L 41/14* (2013.01); *H04L 43/026* (2013.01); *H04L 63/1433* (2013.01); *H04L 63/20* (2013.01); *G06F 2221/034* (2013.01); *G06Q 10/06315* (2013.01)

(58) Field of Classification Search
CPC ... H04L 43/026; H04L 63/1433; H04L 63/20; H04L 43/0823; H04L 41/142; H04L 41/22; H04L 41/5058; G06Q 10/06315; Y02P 90/80
See application file for complete search history.

(56) References Cited

U.S. PATENT DOCUMENTS

| | | | |
|---|---|---|---|
| 6,487,666 B1 | 11/2002 | Shanklin et al. | |
| 7,540,025 B2 | 5/2009 | Tzadikario | |
| 7,703,138 B2 | 4/2010 | Desai et al. | |
| 7,904,962 B1 | 3/2011 | Jajodia et al. | |
| 8,099,760 B2 | 1/2012 | Cohen et al. | |
| 8,176,561 B1* | 5/2012 | Hurst ................. H04L 63/1433 | |
| | | | 726/1 |
| 8,656,493 B2 | 2/2014 | Capalik | |
| 8,881,288 B1 | 11/2014 | Levy et al. | |
| 9,256,739 B1* | 2/2016 | Roundy .............. H04L 63/1425 | |
| 9,563,771 B2 | 2/2017 | Lang et al. | |
| 9,633,306 B2* | 4/2017 | Liu ........................ G06N 3/082 | |
| 10,084,804 B2 | 9/2018 | Kapadia et al. | |
| 10,095,990 B2* | 10/2018 | Farooq ............... G06Q 30/0201 | |
| 10,291,645 B1 | 5/2019 | Frantzen et al. | |
| 10,382,473 B1 | 8/2019 | Ashkenazy et al. | |
| 10,447,721 B2 | 10/2019 | Lasser | |
| 10,447,727 B1 | 10/2019 | Hecht | |
| 10,505,967 B1* | 12/2019 | Schwartz ............ H04L 63/1433 | |
| 10,601,854 B2 | 3/2020 | Lokamathe et al. | |
| 10,642,840 B1 | 5/2020 | Attaluri et al. | |
| 10,659,488 B1 | 5/2020 | Rajasooriya et al. | |
| 10,771,492 B2 | 9/2020 | Hudis et al. | |
| 10,848,515 B1 | 11/2020 | Pokhrel et al. | |
| 10,868,825 B1* | 12/2020 | Dominessy ......... H04L 63/1433 | |
| 10,873,533 B1 | 12/2020 | Ismailsheriff et al. | |
| 10,956,566 B2 | 3/2021 | Shu et al. | |
| 10,958,667 B1 | 3/2021 | Maida et al. | |
| 11,089,040 B2 | 8/2021 | Jang et al. | |
| 11,128,654 B1 | 9/2021 | Joyce et al. | |
| 11,159,555 B2 | 10/2021 | Hadar et al. | |
| 11,184,385 B2 | 11/2021 | Hadar et al. | |
| 11,232,235 B2 | 1/2022 | Hadar et al. | |
| 11,277,431 B2 | 3/2022 | Hassanzadeh et al. | |
| 11,281,806 B2 | 3/2022 | Hadar et al. | |
| 11,283,824 B1 | 3/2022 | Berger et al. | |
| 11,283,825 B2 | 3/2022 | Grabois et al. | |
| 11,411,976 B2 | 8/2022 | Basovskiy et al. | |
| 11,483,213 B2 | 10/2022 | Engelberg et al. | |
| 11,533,332 B2 | 12/2022 | Engelberg et al. | |
| 2005/0138413 A1 | 6/2005 | Lippmann et al. | |
| 2005/0193430 A1 | 9/2005 | Cohen et al. | |
| 2006/0037077 A1 | 2/2006 | Gadde et al. | |
| 2006/0190605 A1* | 8/2006 | Franz ............... G06Q 10/06315 | |
| | | | 709/226 |
| 2008/0044018 A1 | 2/2008 | Scrimsher et al. | |
| 2008/0289039 A1 | 11/2008 | Rits et al. | |
| 2008/0301765 A1 | 12/2008 | Nicol et al. | |
| 2009/0077666 A1* | 3/2009 | Chen ..................... G06F 21/577 | |
| | | | 726/25 |
| 2009/0105092 A1* | 4/2009 | Lipkin .................. G16B 50/00 | |
| | | | 435/5 |
| 2009/0138590 A1 | 5/2009 | Lee et al. | |
| 2009/0307772 A1 | 12/2009 | Markham et al. | |
| 2009/0319248 A1 | 12/2009 | White et al. | |
| 2010/0027432 A1* | 2/2010 | Gopalan ............... H04L 41/147 | |
| | | | 370/252 |
| 2010/0058456 A1 | 3/2010 | Jajodia et al. | |
| 2010/0138925 A1 | 7/2010 | Barai et al. | |
| 2010/0174670 A1 | 7/2010 | Malik et al. | |
| 2011/0035803 A1 | 2/2011 | Lucangeli Obes et al. | |
| 2011/0061104 A1 | 3/2011 | Sarraute Yamada et al. | |
| 2011/0093916 A1 | 4/2011 | Lang et al. | |
| 2011/0093956 A1 | 4/2011 | Laarakkers et al. | |
| 2013/0097125 A1 | 4/2013 | Marvasti et al. | |
| 2013/0219503 A1 | 8/2013 | Amnon et al. | |
| 2014/0032255 A1* | 1/2014 | Hegazi ............. G06Q 10/06312 | |
| | | | 705/7.22 |
| 2014/0082738 A1 | 3/2014 | Bahl | |
| 2014/0115010 A1* | 4/2014 | Seth ..................... G06F 16/9024 | |
| | | | 707/798 |
| 2014/0173740 A1 | 6/2014 | Albanese et al. | |
| 2015/0047026 A1 | 2/2015 | Neil et al. | |
| 2015/0106867 A1 | 4/2015 | Liang | |
| 2015/0199207 A1 | 7/2015 | Lin et al. | |
| 2015/0261958 A1 | 9/2015 | Hale et al. | |
| 2015/0326601 A1 | 11/2015 | Grondin et al. | |
| 2015/0350018 A1 | 12/2015 | Hui et al. | |
| 2016/0105454 A1 | 4/2016 | Li et al. | |
| 2016/0205122 A1 | 7/2016 | Bassett | |
| 2016/0277423 A1 | 9/2016 | Apostolescu et al. | |
| 2016/0292599 A1 | 10/2016 | Andrews et al. | |
| 2016/0301704 A1 | 10/2016 | Hassanzadeh et al. | |
| 2016/0301709 A1 | 10/2016 | Hassanzadeh et al. | |
| 2017/0012836 A1 | 1/2017 | Tongaonkar et al. | |
| 2017/0032130 A1 | 2/2017 | Joseph et al. | |
| 2017/0041334 A1 | 2/2017 | Kahn et al. | |
| 2017/0078322 A1 | 3/2017 | Seiver et al. | |
| 2017/0085595 A1 | 3/2017 | Ng et al. | |
| 2017/0163506 A1* | 6/2017 | Keller ..................... H04L 43/16 | |
| 2017/0230410 A1 | 8/2017 | Hassanzadeh et al. | |
| 2017/0318050 A1 | 11/2017 | Hassanzadeh et al. | |
| 2017/0324768 A1 | 11/2017 | Crabtree et al. | |
| 2017/0364702 A1 | 12/2017 | Goldfarb et al. | |
| 2017/0366416 A1 | 12/2017 | Beecham et al. | |
| 2018/0013771 A1 | 1/2018 | Crabtree et al. | |
| 2018/0103052 A1 | 4/2018 | Choudhury et al. | |
| 2018/0152468 A1* | 5/2018 | Nor ........................ H04L 43/045 | |
| 2018/0159890 A1 | 6/2018 | Warnick et al. | |
| 2018/0183827 A1 | 6/2018 | Zorlular et al. | |
| 2018/0255077 A1 | 9/2018 | Paine | |
| 2018/0255080 A1 | 9/2018 | Paine | |
| 2018/0278477 A1* | 9/2018 | Auvenshine ........ H04L 41/0869 | |
| 2018/0295154 A1 | 10/2018 | Crabtree et al. | |
| 2018/0367548 A1 | 12/2018 | Stokes, III et al. | |
| 2019/0052663 A1* | 2/2019 | Lee ......................... H04L 63/20 | |
| 2019/0052664 A1 | 2/2019 | Kibler et al. | |
| 2019/0132344 A1 | 5/2019 | Lem et al. | |
| 2019/0141058 A1 | 5/2019 | Hassanzadeh et al. | |
| 2019/0182119 A1 | 6/2019 | Ratkovic et al. | |
| 2019/0188389 A1 | 6/2019 | Peled et al. | |
| 2019/0230129 A1 | 7/2019 | Digiambattista et al. | |
| 2019/0312898 A1 | 10/2019 | Verma et al. | |
| 2019/0319987 A1 | 10/2019 | Levy et al. | |
| 2019/0362279 A1 | 11/2019 | Douglas | |
| 2019/0373005 A1 | 12/2019 | Bassett | |
| 2020/0014718 A1 | 1/2020 | Joseph Durairaj et al. | |
| 2020/0042328 A1 | 2/2020 | Gupta | |
| 2020/0042712 A1 | 2/2020 | Foo et al. | |
| 2020/0045069 A1 | 2/2020 | Nanda et al. | |
| 2020/0099704 A1 | 3/2020 | Lee et al. | |
| 2020/0112487 A1 | 4/2020 | Inamdar et al. | |
| 2020/0128047 A1 | 4/2020 | Biswas et al. | |
| 2020/0137104 A1 | 4/2020 | Hassanzadeh et al. | |
| 2020/0175175 A1* | 6/2020 | Hadar ..................... H04L 41/22 | |

(56) References Cited

U.S. PATENT DOCUMENTS

| | | |
|---|---|---|
| 2020/0177615 A1 | 6/2020 | Grabois et al. |
| 2020/0177616 A1 | 6/2020 | Hadar et al. |
| 2020/0177617 A1 | 6/2020 | Hadar et al. |
| 2020/0177618 A1 | 6/2020 | Hassanzadeh et al. |
| 2020/0177619 A1 | 6/2020 | Hadar et al. |
| 2020/0272972 A1 | 8/2020 | Harry et al. |
| 2020/0296137 A1 | 9/2020 | Crabtree et al. |
| 2020/0311630 A1 | 10/2020 | Risoldi et al. |
| 2020/0351295 A1 | 11/2020 | Nhlabatsi et al. |
| 2020/0358804 A1 | 11/2020 | Crabtree et al. |
| 2021/0006582 A1 | 1/2021 | Yamada et al. |
| 2021/0014265 A1 | 1/2021 | Hadar et al. |
| 2021/0099490 A1 | 4/2021 | Crabtree et al. |
| 2021/0105294 A1 | 4/2021 | Kruse et al. |
| 2021/0168175 A1 | 6/2021 | Crabtree et al. |
| 2021/0173711 A1 | 6/2021 | Crabtree et al. |
| 2021/0218770 A1 | 7/2021 | Ben-Yosef et al. |
| 2021/0248443 A1 | 8/2021 | Shu et al. |
| 2021/0273978 A1 | 9/2021 | Hadar et al. |
| 2021/0288995 A1 | 9/2021 | Attar et al. |
| 2021/0336981 A1 | 10/2021 | Akella et al. |
| 2021/0409426 A1 | 12/2021 | Engelberg et al. |
| 2021/0409439 A1 | 12/2021 | Engelberg et al. |
| 2022/0014445 A1 | 1/2022 | Engelberg et al. |
| 2022/0014534 A1 | 1/2022 | Basovskiy et al. |
| 2022/0021698 A1 | 1/2022 | Hadar et al. |
| 2022/0038491 A1 | 2/2022 | Hadar et al. |
| 2022/0051111 A1 | 2/2022 | Hadar et al. |
| 2022/0070202 A1 | 3/2022 | Busany et al. |
| 2022/0124115 A1 | 4/2022 | Grabois et al. |
| 2022/0131894 A1 | 4/2022 | Hassanzadeh et al. |
| 2022/0150270 A1 | 5/2022 | Klein et al. |
| 2022/0182406 A1 | 6/2022 | Inokuchi |
| 2022/0188460 A1 | 6/2022 | Hadar et al. |
| 2022/0263855 A1 | 8/2022 | Engelberg et al. |
| 2022/0337617 A1 | 10/2022 | Basovskiy et al. |
| 2023/0021961 A1 | 1/2023 | Engelberg et al. |
| 2023/0034910 A1 | 2/2023 | Engelberg et al. |
| 2023/0067128 A1 | 3/2023 | Engelberg et al. |
| 2023/0067777 A1 | 3/2023 | Hadar et al. |
| 2023/0076372 A1 | 3/2023 | Engelberg et al. |

FOREIGN PATENT DOCUMENTS

| | | |
|---|---|---|
| EP | 2385676 | 11/2011 |
| EP | 2816773 | 12/2014 |
| EP | 3644579 | 4/2020 |
| EP | 3664411 | 6/2020 |
| WO | WO 2018/002484 | 1/2018 |
| WO | WO 2020/242275 | 12/2020 |

OTHER PUBLICATIONS

Annane et al., "BBO: BPMN 2.0 based ontology for business process representation," Presented at Proceedings of the 20th European Conference on Knowledge Management (ECKM 2019), Lisbonne, Portugal, Sep. 5-6, 2019, 49-59.

Ashton et al., "That 'internet of things' thing," RFID Journal, Jun. 22, 2009, 1 page.

Borgo et al., "Ontological Foundations of DOLCE," Theory and Applications of Ontology: Computer Applications, Aug. 5, 2010, 279-295.

Burger et al., "Scaling to the end of silicon with edge architectures," Computer, Jul. 2004, 37(7):44-55.

Cravero, "Big data architectures and the internet of things: A systematic mapping study," IEEE Latin America Transactions, Apr. 2018, 16(4):1219-1226.

Daniele et al., "An ontological approach to logistics," Enterprise Interoperability: Research and Applications in the Service-oriented Ecosystem, Oct. 11, 2013, 199-213.

Degen et al., "Gol: toward an axiomatized upper-level ontology," Presented at Proceedings of the International Conference on Formal Ontology in Information Systems, Ogunquit, Maine, USA, Oct. 17-19, 2001, 34-46.

Duarte et al., "Towards an Ontology of Requirements at Runtime," Formal Ontology in Information Systems, Jan. 2016, 283:255-268.

El Saddik, "Digital Twins: The Convergence of Multimedia Technologies," IEEE MultiMedia, Apr.-Jun. 2018, 25(2):87-92.

Gailly et al., "Ontological Reengineering of the REA-EO using UFO," Presented at Proceedings of the International Workshop on Ontology-Driven Software Engineering, Orlando, FL, USA, Oct. 2009, 15 pages.

Gandomi et al., "Beyond the hype: Big data concepts, methods, and analytics," International Journal of Information Management, Apr. 2015, 35(2):137-144.

Genovese, "Data mesh: the newest paradigm shift for a distributed architecture in the data world and its application," Thesis for the degree of Computer Engineering, Politecnico di Torino, 2021, 76 pages.

Giunchiglia et al., "Lightweight Ontologies," Technical Report DIT-07-071, University of Trento, Oct. 2007, 10 pages.

Gomez-Perez et al., "Ontology languages for the Semantic Web," IEEE Intelligent Systems, Feb. 2002, 17(1):54-60.

Guarino, "Formal Ontology in Information Systems," Presented at Proceedings of the 1st International Conference, Trento, Italy, Jun. 6-8, 1998, 3-15.

Guizzardi et al., "An Ontology-Based Approach for Evaluating the Domain Appropriateness and Comprehensibility Appropriateness of Modeling Languages," MoDELS, 2005, 691-705.

Guizzardi, "On Ontology, ontologies, Conceptualizations, Modeling Languages, and (Meta)Models," Presented at Proceedings of the 2007 conference on Databases and Information Systems IV: Selected Papers from the Seventh International Baltic Conference, Amsterdam, Netherlands, Jun. 5, 2007, 18 pages.

Guizzardi, "Ontological Foundations for Structural Conceptual Models," Thesis for the degree of Doctor, University of Twente, 2005, 441 pages.

Guizzardi, "Ontology, Ontologies and the "I" of FAIR," Data Intelligence, Jan. 1, 2020, 2(1-2):181-191.

Guizzardi, "The role of foundational ontology for conceptual modeling and domain ontology representation," Presented at Proceedings of the 7th International Baltic Conference on Databases and Information Systems, Vilnius, Lithuania, Jul. 3-6, 2006, 9 pages.

Hassani et al., "Artificial Intelligence (AI) or Intelligence Augmentation (IA): What Is the Future?," AI, Apr. 12, 2020, 1(2):143-155.

Herre, "General Formal Ontology (Gfo): A Foundational Ontology for Conceptual Modelling," Theory and Applications of Ontology: Computer Applications, Aug. 12, 2010, 297-345.

Jacobsen et al., "FAIR Principles: Interpretations and Implementation Considerations," Data Intelligence, Jan. 1, 2020, 2(1-2):10-29.

Machado et al., "Data Mesh: Concepts and Principles of a Paradigm Shift in Data Architectures," Procedia Computer Science, 2022, 196:263-271.

Machado et al., "Data-Driven Information Systems: The Data Mesh Paradigm Shift," Presented at Proceedings of the 29th International Conference on Information Systems Development, Valencia, Spain, Sep. 8-10, 2021, 6 pages.

Makridakis, "The forthcoming artificial intelligence (ai) revolution: Its impact on society and firms," Futures, Jun. 2017, 90:46-60.

Martins et al., "A framework for conceptual characterization of ontologies and its application in the cybersecurity domain," Software and Systems Modeling, Jul. 2, 2022, 21:1437-1464.

Martins et al., "Conceptual Characterization of Cybersecurity Ontologies," The Practice of Enterprise Modelling, Nov. 18, 2020, 323-338.

Mathis, "Data lakes," Datenbank-Spektrum, Oct. 6, 2017, 17(3):289-293.

Monino, "Data Value, Big Data Analytics, and Decision-Making," Journal of the Knowledge Economy, Aug. 20, 2016, 256-267.

Sales et al., "Ontological anti-patterns in taxonomic structures," Presented at Proceedings of ONTOBRAS 2019: XII Seminar on Ontology Research in Brazil, Porto Alegre, Brazil, Sep. 2-5, 2019, 13 pages.

(56) References Cited

OTHER PUBLICATIONS

Sitton-Candanedo et al., "A review of edge computing reference architectures and a new global edge proposal," Future Generation Computer Systems, Oct. 2019, 99:278-294.
Tan et al., "Future internet: The Internet of Things," Presented at Proceedings of the 2010 3rd International Conference on Advanced Computer Theory and Engineering (ICACTE), Chengdu, China, Aug. 20-22, 2010.
Uschold et al., "Ontologies: Principles, methods and applications," The Knowledge Engineering Review, Jan. 1996, 11(2):93-136.
Van Heijst et al., "Using explicit ontologies in KBS development," International Journal of Human-Computer Studies, Feb. 1997, 46(2-3):183-292.
Wand et al., "On the deep structure of information systems," Information Systems Journal, Jul. 1995, 5(3):203-223.
Wang et al., "Big data analytics in cyber security: network traffic and attacks," Journal of Computer Information Systems, Jan. 2020, 61(3):1-8.
Wu et al., "A service-oriented architecture for business intelligence," Presented at Proceedings of the IEEE International Conference on Service-Oriented Computing and Applications (SOCA '07), Newport Beach, CA, USA, Jun. 19-20, 2007, 279-285.
CyberSecurity Works.com [online], "MITRE Mapping of CISA KEVs and its Challenges," Jun. 29, 2022, retrieved on Oct. 4, 2022, retrieved from URL<https://cybersecurityworks.com/blog/cisa/mitre-mapping-of-cisa-kevs-and-its-challenges.html>, 6 pages.
Cycognito.com [online], "Identifying and Managing Vulnerabilities on All Your Attacker-Exposed Assets, All the Time: Benefits of the CyCognito Platform for Vulnerability Management," available on or before Oct. 22, 2020 via Internet Archive: Wayback Machine URL<https://web.archive.org/web/20201022120625/https://www.cycognito.com/vulnerability-management>, retrieved on Oct. 4, 2022, retrieved from URL<https://www.cycognito.com/vulnerability-management>, 15 pages.
Das et al., "V2W-BERT: A Framework for Effective Hierarchical Multiclass Classification of Software Vulnerabilities," CoRR, submitted on Feb. 23, 2021, arXiv:2102.11498v1, 11 pages.
GitHub.com [online], "ALFA-group/BRON," available on or before Nov. 23, 2021 via Internet Archive: Wayback Machine URL<https://web.archive.org/web/20211123023700/https://github.com/ALFA-group/BRON>, retrieved on Oct. 4, 2022, retrieved from URL<https://github.com/ALFA-group/BRON>, 5 pages.
Grigorescu et al., "CVE2ATT&CK: BERT-Based Mapping of CVEs to MITRE ATT&CK Techniques," Algorithms, Aug. 31, 2022, 15(9):314, 22 pages.
Mitre.org [online], "CAPEC: Common Attack Pattern Enumerations and Classifications," available on or before Jul. 21, 2007 via Internet Archive: Wayback Machine URL<https://web.archive.org/web/20070721234158/https://capec.mitre.org/>, retrieved on Oct. 4, 2022, retrieved from URL<https://capec.mitre.org/>, 2 pages.
Mitre.org [online], "CWE: Common Weakness Enumeration," available on or before Oct. 9, 2006 via Internet Archive: Wayback Machine URL<https://web.archive.org/web/20061009060144/https://cwe.mitre.org/>, retrieved on Oct. 4, 2022, retrieved from URL<https://cwe.mitre.org/>, 1 page.
W3.org [online], "SWRL: A Semantic Web Rule Language Combining OWL and RuleML," May 21, 2004, retrieved on Oct. 4, 2022, retrieved from URL<https://www.w3.org/Submission/SWRL/>, 24 pages.
Chen Zhong, Towards Agile Cyber Analysis: Leveraging Visualization as Functions in Collaborative Visual Analytics, IEEE:2017, pp. 1-2.
EP Extended Search Report in European Appln. No. 22187514.9, dated Nov. 29, 2022, 7 pages.
3DS.com [online], "New Customer Experience," available on or before Aug. 7, 2020 via Internet Archive: Wayback Machine URL<https://web.archive.org/web/20200807204455/https://ifwe.3ds.com/transportation-mobility/new-customer-experience>, retrieved on Jul. 9, 2021, retrieved from URL<https://ifwe.3ds.com/transportation-mobility/new-customer-experience>, 9 pages.

Abraham et al., "Cyber Security Analytics: A Stochastic Model for Security Quantification Using Absorbing Markov Chains," Journal of Communications, Dec. 2014, 9(12):899-907.
Alvarenga et al., "Discovering Attack Strategies Using Process Mining," Presented at Proceedings of The Eleventh Advanced International Conference on Telecommunications, Brussels, Belgium, Jun. 21-26, 2015, 119-125.
Amar et al., "Using finite-state models for log differencing," Proceedings of the 2018 26th ACM Joint Meeting on European Software Engineering Conference and Symposium on the Foundations of Software Engineering (ESEC/FSE 2018), Lake Buena Vista, Florida, Nov. 4-9, 2018, 49-59.
Atoum et al., "A holistic cyber security implementation framework," Information Management & Computer Security, Jul. 2014, 22(3):251-264.
Barik et al., "Attack Graph Generation and Analysis Techniques," Defence Science Journal, Nov. 2016, 66(6):559-567.
Barrère et al., "Naggen: a Network Attack Graph GENeration Tool—IEE CNS 17 Poster," 2017 IEEE Conference on Communications and Network Security, Oct. 2017, Las Vegas, NV, USA, 378-379.
Bonacich, "Power and Centrality: A Family of Measures," American Journal of Sociology, Mar. 1987, 92(5):1170-1182.
Borgatti et al., "A Graph-theoretic perspective on centrality," Social Networks, Oct. 2006, 28(4):466-484.
Challenge.org [online], "Incorporating digital twin into internet cyber security—creating a safer future," May 2018, retrieved on Jul. 9, 2021, retrieved from URL<https://www.challenge.org/insights/digital-twin-cyber-security/>, 10 pages.
Chen et al., "Distributed Attack Modeling Approach Based on Process Mining and Graph Segmentation," Entropy, Sep. 2020, 22(9):1026, 21 pages.
Cohen-Addad et al., "Hierarchical Clustering: Objective Functions and Algorithms," Journal of the ACM, Jun. 2019, 66(4):26, 42 pages.
Coltellese et al., "Triage of IoT Attacks Through Process Mining," Presented at Proceedings of On the Move to Meaningful Internet Systems Conference 2019, Rhodes, Greece, Oct. 21-25, 2019; Lecture Notes in Computer Science, Oct. 2019, 11877:326-344.
EP Search Report in European Application No. EP 19212981, dated Mar. 4, 2020, 6 pages.
EP Search Report in European Application No. EP13290145, dated Nov. 12, 2013, 2 pages.
EP Search Report in European Application No. EP19212974, dated Feb. 14, 2020, 8 pages.
EP Search Report in European Application No. EP19212976, dated Feb. 14, 2020, 8 pages.
EP Search Report in European Application. No. 21159421.3, dated Jun. 30, 2021, 11 pages.
EP Search Report in European Application. No. EP20185251, dated Oct. 21, 2020, 7 pages.
Fielder et al., "Decision support approaches for cyber security investment," Decision Support Systems, Jun. 2016, 86:13-23.
Foundations of Databases, 1st ed., Abiteboul et al. (eds.), 1995, Chapter 12, 38 pages.
Fundamentals of Business Process Management, 2nd ed., Dumas et al. (eds.), 2018, 546 pages.
GE.com [online], "Predix Platform," available on or before Nov. 16, 2018 via Internet Archive: Wayback Machine URL<https://web.archive.org/web/20181116005032/https://www.ge.com/digital/iiot-platform>, retrieved on Jul. 9, 2021, retrieved from URL<https://www.ge.com/digital/iiot-platform>, 6 pages.
Gergeleit et al., "Modeling Security Requirements and Controls for an Automated Deployment of Industrial IT Systems," Kommunikation und Bildverarbeitung in der Automation. Technologien für die intelligente Automation (Technologies for Intelligent Automation), Jan. 14, 2020, 12:217-231.
Grieves, "Virtually Intelligent Product Systems: Digital and Physical Twins", Complex Systems Engineering: Theory and Practice, Jul. 2019, 256:175-200.
Hadar et al., "Big Data Analytics on Cyber Attack Graphs for Prioritizing Agile Security Requirements", Proceedings of the 2019

(56) References Cited

OTHER PUBLICATIONS

IEEE 27th International Requirements Engineering Conference, Sep. 23-27, 2019, Jeju Island, Kora, 330-339.
Hadar et al., "Cyber Digital Twin Simulator for Automatic Gathering and Prioritization of Security Controls Requirements," Proceedings of the 2020 IEEE 28th International Requirements Engineering Conference, Aug. 31-Sep. 4, 2020, Zurich, Switzerland, 250-259.
Hansen et al., "Model-in-the-Loop and Software-in-the-Loop Testing of Closed-Loop Automotive Software with Arttest," Informatik, 2017, 13 pages.
Hasan et al., "Towards Optimal Cyber Defense Remediation in Energy Delivery Systems", Proceedings of 2019 IEEE Global Communications Conference, Dec. 9-13, 2019, Waikoloa, Hawaii, 7 pages.
Hofner et al., "Dijkstra, Floyd and Warshall meet Kleene," Formal Aspects of Computing, Jul. 2012, 24(4-6):459-476.
Husák et al., "Survey of Attack Projection, Prediction, and Forecasting in Cyber Security," IEEE Communications Surveys & Tutorials, Sep. 24, 2018, 21(1):640-660.
Idika et al., "Extending attack graph-based security metrics and aggregating their application," IEEE Transactions on Dependable and Secure Computing, Jan./Feb. 2012, 9(1):75-85.
IEEE, "IEEE Standard for eXtensible Event Stream (XES) for Achieving Interoperability in Event Logs and Event Stream," IEEE Std 1849™-2016, Sep. 22, 2016, 50 pages.
IEEE.org [online], "This Car Runs on Code," Feb. 1, 2009, retrieved on Jul. 9, 2021, retrieved from URL<https://spectrum.ieee.org/transportation/systems/this-car-runs-on-code>, 5 pages.
Ingols et al., "Practical Attack Graph Generation for Network Defense," 2006 22nd Annual Computer Security Applications Conference (ACSAC'06), Miami Beach, Florida, Dec. 11-15, 2006, 10 pages.
International Organization for Standardization, "International Standard: ISO/IEC 27001," ISO/IEC 27001:2013(E), Oct. 1, 2013, 29 pages.
Joint Task Force Transformation Initiative, "Security and Privacy Controls for Federal Information Systems and Organizations," National Institute of Standards and Technology Special Publication 800-53, Revision 4, Jan. 22, 2015, 462 pages.
Khouzani et al., "Scalable min-max multi-objective cyber-security optimization over probabilistic attack graphs", European Journal of Operational Research, Nov. 1, 2019, 278(3):894-903.
Li et al., "Cluster security research involving the modeling of network exploitations using exploitation graphs," Proceedings of the IEEE International Symposium on Cluster Computing and the Grid, Singapore, May 16-19, 2006, 11 pages.
Lippmann et al., "Validating and restoring defense in depth using attack graphs," Proceedings of the Military Communications Conference, Washington, DC, USA, Oct. 23-25, 2006, 10 pages.
Lu et al., "Ranking attack graphs with graph neural networks," Proceedings of the 5th International Conference on Information Security Practice and Experience, Xi'an, China, Apr. 13-15, 2009; Lecture Notes in Computer Science, Apr. 2009, 5451:345-359.
Manning Free Content Center [online], "Building Your Vocabulary," dated May 19, 2017, retrieved on Jun. 3, 2020, retrieved from URL <https://freecontent.manning.com/building-your-vocabulary/>, 10 pages.
MaschinenMarkt.international [online], "Digital twin in the automobile industry," Aug. 1, 2019, retrieved on Jul. 9, 2021, retrieved from URL<https://www.maschinenmarkt.international/digital-twin-in-the-automobile-industry-a-851549/>, 3 pages.
Mashable.com [online], "Ford ready to innovate, but not at the expense of customer needs," May 31, 2016, retrieved on Jul. 9, 2021, retrieved from URL<https://mashable.com/article/mark-fields-ford-codecon>, 7 pages.
Mehta et al., "Ranking attack graphs," Proceedings of the International Conference on Recent Advances in Intrusion Detection, Hamburg, Germany, Sep. 20-22, 2006; Lecture Notes in Computer Science, Sep. 2006, 4219:127-144.

Murata, "Petri Nets: Properties, Analysis and Applications," Proceedings of the IEEE, Apr. 1989, 77(4):541-580.
Narmeen Zakaria Bawany; DDOS Attack Detection and Mitigation Using SON: Methods, Practices, and Solutions; Springer-2017; p. 425-441.
National Institute of Standards and Technology [online], "National Vulnerability Database," last updated Jun. 2, 2020, retrieved on Jun. 3, 2020, retrieved from URL<https://nvd.nist.gov/>, 4 pages.
Neo4j.com [online], "Random Walk," available on or before Aug. 6, 2020 via Internet Archive: Wayback Machine URL<https://web.archive.org/web/20200806193136/https://neo4j.com/docs/graph-data-science/current/alpha-algorithms/random-walk/>, retrieved on Jul. 28, 2021, retrieved from URL<https://neo4j.com/docs/graph-data-science/current/alpha-algorithms/random-walk/>, 7 pages.
Neo4j.com [online], "Yen's K-Shortest Paths," available on or before Aug. 6, 2020 via Internet Archive: Wayback Machine URL<https://web.archive.org/web/20200806185626/https://neo4j.com/docs/graph-data-science/current/alpha-algorithms/yen-s-k-shortest-path/, retrieved on Jul. 28, 2021, retrieved from URL<https://web.archive.org/web/20200806185626/https://neo4j.com/docs/graph-data-science/current/alpha-algorithms/yen-s-k-shortest-path/>, 5 pages.
Networks: An Introduction, Newman (ed.), May 2010, 789 pages.
Noel et al., "CyGraph: Graph-Based Analytics and Visualization for Cybersecurity," Handbook of Statistics, Jan. 2016, 35:117-167.
Ortalo et al., "Experimenting with quantitative evaluation tools for monitoring operational security," IEEE Transactions on Software Engineering, Sep./Oct. 1999, 25(5):633-650.
Ou et al., "A Scalable Approach to Attack Graph Generation," Proceedings of the 13th ACM Conference on Computer and Communication Security, Oct. 2006, 336-345.
Ou et al., "MulVAL: A Logic-based Network Security Analyzer," 14th USENIX Security Symposium, Aug. 2005, Baltimore, MD, USA, 16 pages.
Phillips et al., "A graph-based system for network-vulnerability analysis," Proceedings of the 1998 Workshop on New Security Paradigms, Charlottesville, Virginia, Sep. 22-26, 1998, 71-79.
PM4Py.de [online], "DFG: Process Discovery using Directly-Follows Graphs, " available on or before Mar. 7, 2019 via Internet Archive: Wayback Machine URL<https://web.archive.org/web/20190307062454/http://pm4py.pads.rwth-aachen.de/documentation/process-discovery/dfg/>, retrieved on Jul. 28, 2021, retrieved from URL<https://web.archive.org/web/20190307062454/http://pm4py.pads.rwth-aachen.de/documentation/process-discovery/dfg/>, 4 pages.
PM4Py.de [online], "Process Discovery," available on or before Jun. 26, 2020 via Internet Archive: Wayback Machine URL<https://web.archive.org/web/20200626094921/https://pm4py.fit.fraunhofer.de/documentation#discovery>, retrieved on Jul. 28, 2021, retrieved from URL<https://pm4py.fit.fraunhofer.de/documentation#discovery>, 5 pages.
Process Mining, 1st ed., van der Aalst, 2011, Chapters 5-6, 63 pages.
Purvine et al., "A Graph-Based Impact Metric for Mitigating Latheral Movement Cyber Attacks", Automated Descision Making for Active Cyber Defence, Oct. 2016, pp. 45-52.
Q. Liu et al., "Latte: Large-Scale Lateral Movement Detection," MILCOM 2018-2018 IEEE Military Communications Conference (MILCOM), 2018, pp. 1-6, doi: 10.1109/MILCOM.2018.8599748. (Year: 2018).
Schatz et al., "Economic valuation for information security investment: a systematic literature review," Information Systems Frontiers, Apr. 18, 2016, 19:1205-1228.
Shandilya et al., "Use of Attack Graphs in Security Systems", Hindawi Journal of Computer Networks and Communications, Oct. 20, 2014, 2014:818957, 14 pages.
Shi et al., "Normalized Cuts and Image Segmentation," IEEE Transactions on Pattern Analysis and Machine Intelligence, Aug. 2000, 22(8):888-905.
Siemens.com [online], "From vehicle design to multi-physical simulations," available on or before Jul. 26, 2019 via Internet Archive: Wayback Machine URL<https://web.archive.org/web/20190726044643/https://new.siemens.com/global/en/markets/automotive-manufacturing/digital-twin-product.html>, retrieved on

(56) References Cited

OTHER PUBLICATIONS

Jul. 9, 2021, retrieved from URL<https://new.siemens.com/global/en/markets/automotive-manufacturing/digital-twin-product.html>, 11 pages.

SMMT.co.uk [online], "Role of Digital Twin in Automotive Industry," Dec. 17, 2018, retrieved on Jul. 9, 2021, retrieved from URL<https://www.smmt.co.uk/2018/12/role-of-digital-twin-in-automotive-industry/>, 9 pages.

Sourceforge.net [online], "XSB," last updated Oct. 29, 2017, retrieved on Jun. 3, 2020, retrieved from URL <http://xsb.sourceforge.net/>, 2 pages.

Stanek et al., "Method of comparing graph differencing algorithms for software differencing," 2008 IEEE International Conference on Electro/Information Technology, Ames, Iowa, May 18-20, 2008, 482-487.

Strom et al., "MITRE ATT&CK™: Design and Philosophy", The MITRE Corporation, Jul. 2018, 37 pages.

Swiler et al., "A graph-based network-vulnerability analysis system," Sandia National Laboratories, 1997, Tech. Rep. SAND97-3010/1, 25 pages.

TechCrunch.com [online], "Tesla is rolling out its Navigate on Autopilot feature," Oct. 27, 2018, retrieved on Jul. 9, 2021, retrieved from URL<https://techcrunch.com/2018/10/26/tesla-is-rolling-out-its-navigate-on-autopilot-feature/>, 17 pages.

The Fourth Industrial Revolution, 1st. ed., Schwab, Jan. 2017, 218 pages.

The MITRE Corporation [online], "MITRE ATT&CK," last updated May 27, 2020, retrieved on Jun. 3, 2020, retrieved from URL <https://attack.mitre.org/>, 3 pages.

Ullah et al., "Towards Modeling Attacker's Opportunity for Improving Cyber Resilience in Energy Delivery Systems", Resilience Week, Aug. 2018, pp. 100-107.

Van Der Aalst et al., "Causal Nets: A Modeling Language Tailored towards Process Discovery," Presented at Proceedings of CONCUR 2011—Concurrency Theory, Aachen, Germany, Sep. 6-9, 2011; Lecture Notes in Computer Science, Sep. 2011, 6901:28-42.

Vehicle Power Management, 1st ed., Zhang et al.(eds.), Aug. 2011, Chapter 10, 27 pages.

Wang et al., "A Network Vulnerability Assessment Method Based on Attack Graph," 2018 IEEE 4th International Conference on Computer and Communications, Dec. 7-10, 2018, Chengdu, China, 1149-1154.

Wang et al., "Exploring Attack Graph for Cost-benefit Security Hardening: A Probabilistic Approach," Computers & Security, Feb. 2013, 32:158-169.

Ward et al., "Threat Analysis and Risk Assessment in Automotive Cyber Security," SAE Int. J. Passeng. Cars Electron. Electr. Systems, May 2013, 6(2):507-513.

Wikipedia.org [online], "5G," last updated Jul. 9, 2021, retrieved on Jul. 9, 2021, retrieved from URL<https://en.wikipedia.org/wiki/5G>, 29 pages.

Wikipedia.org [online], "Active Directory," last updated Jun. 1, 2020, retrieved on Jun. 3, 2020, retrieved from URL <https://en.wikipedia.org/wiki/Active_Directory>, 14 pages.

Wikipedia.org [online], "Backward Chaining," last updated Nov. 16, 2019, retrieved on Jun. 3, 2020, retrieved from URL <https://en.wikipedia.org/wiki/Backward_chaining>, 3 pages.

Wikipedia.org [online], "Breadth-first search," last updated Jul. 21, 2021, retrieved on Jul. 28, 2021, retrieved from URL<https://en.wikipedia.org/wiki/Breadth-first_search>, 6 pages.

Wikipedia.org [online], "Cartesian Product, " last updated Feb. 28, 2020, retrieved on Jun. 3, 2020, retrieved from URL <https://en.wikipedia.org/wiki/Cartesian_product>, 9 pages.

Wikipedia.org [online], "Centrality," last updated May 29, 2020, retrieved on Jun. 3, 2020, retrieved from URL <https://en.wikipedia.org/wiki/Centrality>, 15 pages.

Wikipedia.org [online], "Centrality," last updated Oct. 18, 2020, retrieved on Oct. 26, 2020, retrieved from URL<https://en.wikipedia.org/wiki/Centrality>, 15 pages.

Wikipedia.org [online], "Common Vulnerabilities and Exposures," last updated Jul. 6, 2021, retrieved on Jul. 9, 2021, retrieved from URL<https://en.wikipedia.org/wiki/Common_Vulnerabilities_and_Exposures>, 5 pages.

Wikipedia.org [online], "Common Vulnerability Scoring System," last updated Jun. 21, 2021, retrieved on Jul. 9, 2021, retrieved from URL<https://en.wikipedia.org/wiki/Common_Vulnerability_Scoring_System>, 7 pages.

Wikipedia.org [online], "Depth-first search," last updated Jun. 16, 2021, retrieved on Jul. 28, 2021, retrieved from URL<https://en.wikipedia.org/wiki/Depth-first_search>, 8 pages.

Wikipedia.org [online], "Digital twin," last updated Jul. 8, 2021, retrieved on Jul. 9, 2021, retrieved from URL<https://en.wikipedia.org/wiki/Digital_twin>, 13 pages.

Wikipedia.org [online], "Eigenvector centrality," last updated Dec. 1, 2020 retrieved on Jan. 11, 2021, retrieved from URL<https://en.wikipedia.org/wiki/Eigenvector_centrality>, 4 pages.

Wikipedia.org [online], "Flood Fill," last updated Dec. 24, 2019, retrieved on Jun. 3, 2020, retrieved from URL <https://en.wikipedia.org/wiki/Flood_fill>, 7 pages.

Wikipedia.org [online], "Floyd-Warshall algorithm," last updated Jan. 5, 2021, retrieved on Jan. 11, 2021, retrieved from URL<https://en.wikipedia.org/wiki/Floyd%E2%80%93Warshall_algorithm>, 7 pages.

Wikipedia.org [online], "Forward Chaining," last updated Nov. 18, 2019, retrieved on Jun. 3, 2020, retrieved from URL <https://en.wikipedia.org/wiki/Forward_chaining>, 3 pages.

Wikipedia.org [online], "Look-ahead (backtracking)," last updated May 23, 2020, retrieved on Jun. 3, 2020, retrieved from URL <https://en.wikipedia.org/wiki/Look-ahead_(backtracking)>, 3 pages.

Wikipedia.org [online], "SCADA," last updated Jun. 2, 2020, retrieved on Jun. 3, 2020, retrieved from URL <https://en.wikipedia.org/wiki/SCADA>, 12 pages.

Wikipedia.org [online], "Sigmoid function," last updated Dec. 25, 2020, retrieved on Jan. 11, 2021, retrieved from URL<https://en.wikipedia.org/wiki/Sigmoid_function>, 4 pages.

Wikipedia.org [online], "SWOT analysis," last updated Oct. 20, 2020, retrieved on Oct. 26, 2020, retrieved from URL<https://en.wikipedia.org/wiki/SWOT_analysis>, 8 pages.

Wikipedia.org [online], "Traffic congestion," last updated Oct. 5, 2020, retrieved on Oct. 26, 2020, retrieved from URL<https://en.wikipedia.org/wiki/Traffic_congestion>, 24 pages.

Wikipedia.org [online], "Traffic flow," last updated Oct. 19, 2020, retrieved on Oct. 26, 2020, retrieved from URL<https://en.wikipedia.org/wiki/Traffic_flow>, 41 pages.

Wikipedia.org [online], "Zero-day (computing)," last updated Oct. 16, 2020, retrieved on Oct. 26, 2020, retrieved from URL<https://en.wikipedia.org/wiki/Zero-day_(computing)>, 8 pages.

X. Li, C. Zhang, T. Jung, J. Qian and L. Chen, "Graph-based privacy-preserving data publication," IEEE Infocom 2016—The 35th Annual IEEE International Conference on Computer Communications, 2016, pp. 1-9, doi: 10.1109/IN F000M.2016.7524584. (Year: 2016).

Xie et al., "Using Bayesian Networks for Cyber Security Analysis," Proceedings of the 2010 IEEE/IFIP International Conference on Dependable Systems & Networks, Jun. 28-Jul. 1, 2010, Chicago, Illinois, 211-220.

Yi et al., "Overview on attack graph generation and visualization technology," 2013 International Conference on Anti-Counterfeiting, Security and Identification (ASID), Shanghai, China, Oct. 25-27, 2013, 6 pages.

You et al., "A Review of Cyber Security Controls from An ICS Perspective," Proceedings of 2018 International Conference on Platform Technology and Service (PlatCon), Jan. 29-31, 2018, Jeju, South Korea, 5 pages.

Zeng et al., "Survey of Attack Graph Analysis Methods from the Perspective of Data and Knowledge Processing," Hindawi Security and Communication Networks, Dec. 26, 2019, 2019:2031063, 17 pages.

Zhang et al., "Co-simulation framework for design of time-triggered cyber physical systems," 2013 ACM/IEEE International Conference on Cyber-Physical Systems (ICCPS), Philadelphia, Pennsylvania, Apr. 8-11, 2013, 119-128.

(56) References Cited

OTHER PUBLICATIONS

Zhang et al., "Optimal Decision-Making Approach for Cyber Security Defense Using Game Theory and Intelligent Learning," Security and Communication Networks, Dec. 23, 2019, 2019:3038586, 17 pages.
Zhao et al., "Attack graph analysis method for large scale network security hardening," J. Front. Comput. Sci. Technology, 2018, 12(2):263-273 (with English Abstract).
EP Extended Search Report in European Appln. No. 21191752.1, dated Jan. 4, 2022, 8 pages.
Brazhuk, "Towards automation of threat modeling based on a semantic model of attack patterns and weaknesses," arXiv, Dec. 8, 2021, arXiv:2112.04231v1, 14 pages.
EP Extended Search Report in European Appln. No. 22157487.4, dated Jun. 9, 2022, 10 pages.
Hemberg et al., "BRON—Linking Attack Tactics, Techniques, and Patterns with Defensive Weaknesses, Vulnerabilities and Affected Platform Configurations," arXiv, Oct. 1, 2020, arXiv:2010.00533v1, 14 pages.
Hemberg et al., "Using a Collated Cybersecurity Dataset for Machine Learning and Artificial Intelligence," arXiv, Aug. 5, 2021, arXiv:2108.02618v1, 5 pages.
Horrocks et al., "SWRL: A Semantic Web Rule Language Combining OWL and RuleML," W3C Member Submission, May 21, 2004, 24 pages.
Neo4j.com [online], "Topological link prediction," available on or before May 17, 2020, via Internet Archive: Wayback Machine URL<https://web.archive.org/web/20200517111258/https://neo4j.com/docs/graph-data-science/current/algorithms/linkprediction/>, retrieved on Jun. 14, 2022, retrieved from URL<https://neo4j.com/docs/graph-data-science/current/algorithms/linkprediction/>, 2 pages.
Rossi et al., "Knowledge Graph Embedding for Link Prediction: A Comparative Analysis," arXiv, Feb. 3, 2020, arXiv:2002.00819v1, 42 pages.
Wikipedia.org [online], "Natural language processing," last updated Jun. 10, 2022, retrieved on Jun. 14, 2022, retrieved from URL<https://en.wikipedia.org/wiki/Natural_language_processing>, 13 pages.
EP Extended Search Report in European Appln. No. 22193272.6, dated Jan. 25, 2023, 8 pages.
Kaloroumakis et al., "Toward a Knowledge Graph of Cybersecurity Countermeasures," Technical Report, The MITRE Corporation, 2021, 11 pages.
MITRE.org [online], "D3FEND," available on or before Jun. 22, 2021 via Internet Archive: Wayback Machine URL<https://web.archive.org/web/20210622142005/https://d3fend.mitre.org/>, retrieved on Jul. 13, 2022, retrieved from URL<https://d3fend.mitre.org/>, 3 pages.
MITRE.org [online], "Digital Artifact Ontology," available on or before Jun. 25, 2021 via Internet Archive: Wayback Machine URL<https://web.archive.org/web/20210625024718/https://d3fend.mitre.org/dao>, retrieved on Jul. 13, 2022, retrieved from URL<https://d3fend.mitre.org/dao/>, 3 pages.
MITRE.org [online], "Service Application," available on or before Jun. 25, 2021 via Internet Archive: Wayback Machine URL<https://web.archive.org/web/20210625024952/https://d3fend.mitre.org/dao/artifact/d3f:ServiceApplication/>, retrieved on Jul. 13, 2022, retrieved from URL<https://d3fend.mitre.org/dao/artifact/d3f:ServiceApplication/>, 1 page.
Wikipedia.org [online], "Reachability," last updated Oct. 22, 2021, retrieved on Jul. 13, 2022, retrieved from URL<https://en.wikipedia.org/wiki/Reachability>, 5 pages.
Abraham et al. "A Predictive Framework for Cyber Security Analytics Using Attack Graphs." International Journal of Computer Networks & Communications (IJCNC). vol. 7, No. 1, Jan. 2015. (Year: 2015).

* cited by examiner

GENERATING ATTACK GRAPHS IN AGILE SECURITY PLATFORMS

CROSS-REFERENCE TO RELATED APPLICATIONS

This application is a continuation of U.S. application Ser. No. 16/556,380, filed on Aug. 30, 2019, which claims priority to U.S. Prov. App. No. 62/774,516, filed on Dec. 3, 2018 and U.S. Prov. App. No. 62/829,696, filed on Apr. 5, 2019, the disclosures of which are incorporated herein by reference in their entireties.

BACKGROUND

Computer networks are susceptible to attack by malicious users (e.g., hackers). For example, hackers can infiltrate computer networks in an effort to obtain sensitive information (e.g., user credentials, payment information, address information, social security numbers) and/or to take over control of one or more systems. To defend against such attacks, enterprises use security systems to monitor occurrences of potentially adverse events occurring within a network, and alert security personnel to such occurrences. For example, one or more dashboards can be provided, which provide lists of alerts that are to be addressed by the security personnel.

In some systems, analytical attack graphs are provided to visually depict enterprise networks and paths therein. For example, in traditional generation of attack graphs, configurations can be determined, and rules are provided that define one or more impacts based on the configurations, which are displayed as an analytical attack graph. Such analytical attack graphs, however, are difficult to understand in terms of the physical components of the enterprise network. That is, such analytical attack graphs do not correlate analytical information to physical environments of enterprise networks.

Threat intelligence information can be used to identify one or more remediations that can be implemented to enhance security of an enterprise network. In general, remediations can be implemented to nullify one or more preconditions to avoid an impact to the enterprise network (e.g., hacker lateral movement). However, remediations can have different costs and impacts. Consequently, executing a remediation or set of remediations may not be an optimal use of time and/or resources. Further, scheduling of remediations may not be optimized, as some remediations cannot occur when desired (e.g., to minimize risk), due to operational constraints.

SUMMARY

Implementations of the present disclosure are directed to an agile security platform for enterprise-wide cyber-security. More particularly, implementations of the present disclosure are directed to an agile security platform that determines asset vulnerability of enterprise-wide assets including cyber-intelligence and discovery aspects of enterprise information technology (IT) systems and operational technology (OT) systems, asset value, and potential for asset breach including hacking analytics of enterprise IT/OT systems. The agile security platform of the present disclosure executes in a non-intrusive manner.

In some implementations, actions include providing, by a security platform, graph data defining a graph that is representative of an enterprise network, the graph including nodes and edges between nodes, a set of nodes representing respective assets within the enterprise network, each edge representing at least a portion of one or more lateral paths between assets in the enterprise network, the graph data including a set of configurations, each configuration affecting at least one impact, each impact including an effect on an asset within the enterprise network, determining, by the security platform, multiple sets of fixes for respective configurations, each fix in a set of fixes having a cost associated therewith, incorporating, by the security platform, fix data representative of the multiple sets of fixes into the graph, defining, by the security platform, a set of fixes including one or more fixes from the multiple sets of fixes by defining an optimization problem that identifies one or more impacts that are to be nullified and executing resolving the optimization problem to define the set of fixes, each fix in the set of fixes being associated with a respective configuration in the graph, and scheduling, by the security platform, performance of each fix in the set of fixes based on one or more operational constraints. Other implementations of this aspect include corresponding systems, apparatus, and computer programs, configured to perform the actions of the methods, encoded on computer storage devices.

These and other implementations can each optionally include one or more of the following features: resolving the optimization problem is executed using a greedy algorithm and a coverage matrix; the coverage matrix defines, for each fix in the multiple sets of fixes one or more impacts that the fix nullifies; the coverage matrix further defines, for each fix in the multiple sets of fixes a linked impact with respect to one or more impacts affected by the fix; scheduling, by the security platform, performance of each fix in the set of fixes is executed by performing a multi-objective optimization to minimize one or more of risk and cost for a given objective; risk represents a risk of one or more vulnerabilities being exploited over time; each fix is one of an official fix that wholly resolves a vulnerability of a configuration, a workaround fix that works around the vulnerability of the configuration, and a temporary fix that only temporarily resolves the vulnerability of the configuration; the cost includes one or more of a monetary cost, a temporal cost, and a resource cost; and assets include one or more of information technology (IT) assets and operational technology (OT) assets.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and

DESCRIPTION OF DRAWINGS

Like reference symbols in the various drawings indicate like elements.

DETAILED DESCRIPTION

Figure 1:
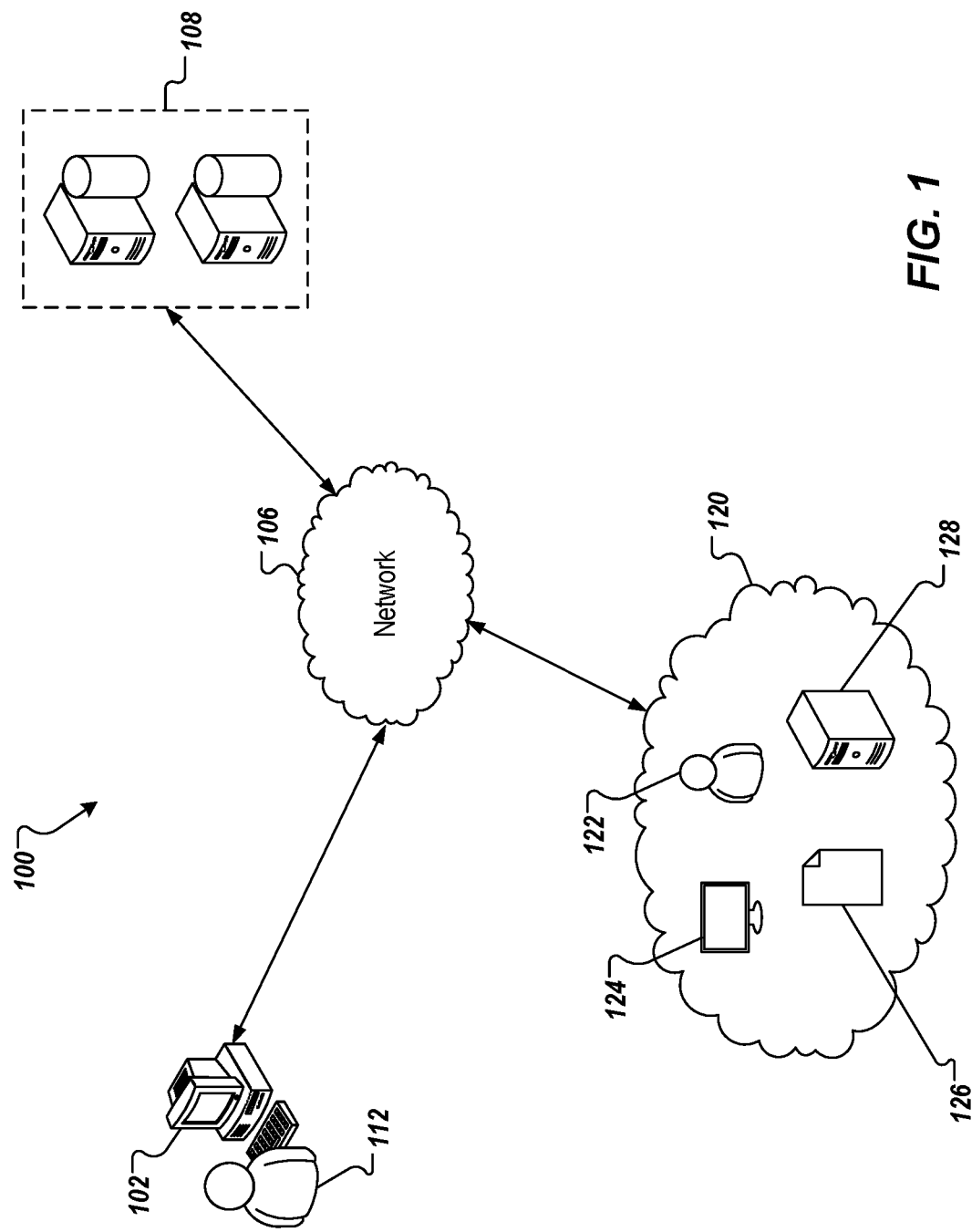
FIG. 1 depicts an example architecture that can be used to execute implementations of the present disclosure.

Implementations of the present disclosure are directed to an agile security platform for enterprise-wide cyber-security. More particularly, implementations of the present disclosure are directed to an agile security platform that determines asset vulnerability of enterprise-wide assets including cyber-intelligence and discovery aspect of enterprise information technology (IT) systems, and enterprise operational technology (OT) systems, asset value, and potential for asset breach including hacking analytics of enterprise IT/OT systems performed in a non-intrusive manner. In general, and as described in further detail herein, the agile security platform of the present disclosure prioritizes risks and respective remediations based on vulnerabilities of assets within an enterprise network (e.g., cyber intelligence and discovery aspect of IT/OT systems), the value of the assets, and the probability that the assets will be breached.

To provide context for implementations of the present disclosure, and as introduced above, analytical attack graphs are provided to visually depict enterprise networks and paths therein. For example, in traditional generation of attack graphs, configurations can be determined, and rules are provided that define one or more impacts based on the configurations, which are displayed as an analytical attack graph. Such analytical attack graphs, however, are difficult to understand in terms of the physical components of the enterprise network. That is, such analytical attack graphs do not correlate analytical information to physical environments of enterprise networks. For example, a path between physical environments within an enterprise network might or might not exist, but that cannot be readily discerned from the analytical attack graph representing the enterprise network.

Further, threat intelligence information can be used to identify one or more remediations that can be implemented to enhance security of an enterprise network. In general, remediations can be implemented to nullify one or more preconditions to avoid an impact to the enterprise network (e.g., hacker lateral movement). However, remediations can have different costs and impacts. Consequently, executing a remediation or set of remediations may not be an optimal use of time and/or resources. Further, scheduling of remediations may not be optimized, as some remediations cannot occur when desired (e.g., to minimize risk), due to operational constraints.

In view of the above context, implementations of the present disclosure are directed to an agile security platform that overcomes deficiencies of traditional techniques. More particularly, the agile security platform of the present disclosure provides a physical AG from an analytical AG and use the physical AG to determine optimal remediations (also referred to herein as fixes). The agile security platform further provides for scheduling of the remediations. In some implementations, actions include providing, by a security platform, graph data defining a graph that is representative of an enterprise network, the graph including nodes and edges between nodes, a set of nodes representing respective assets within the enterprise network, each edge representing at least a portion of one or more lateral paths between assets in the enterprise network, the graph data including a set of configurations, each configuration affecting at least one impact, each impact including an effect on an asset within the enterprise network, determining, by the security platform, multiple sets of fixes for respective configurations, each fix in a set of fixes having a cost associated therewith, incorporating, by the security platform, fix data representative of the multiple sets of fixes into the graph, defining, by the security platform, a set of fixes including one or more fixes from the multiple sets of fixes by defining an optimization problem that identifies one or more impacts that are to be nullified and executing resolving the optimization problem to define the set of fixes, each fix in the set of fixes being associated with a respective configuration in the graph, and scheduling, by the security platform, performance of each fix in the set of fixes based on one or more operational constraints.

As described herein, the agile security platform of the present disclosure enables continuous cyber and enterprise-operations alignment controlled by risk management. The agile security platform of the present disclosure improves decision-making by helping enterprises to prioritize security actions that are most critical to their operations. In some implementations, the agile security platform combines methodologies from agile software development lifecycle, IT management, development operations (DevOps), and analytics that use artificial intelligence (AI). In some implementations, agile security automation bots continuously analyze attack probability, predict impact, and recommend prioritized actions for cyber risk reduction. In this manner, the agile security platform of the present disclosure enables enterprises to increase operational efficiency and availability, maximize existing cyber-security resources, reduce additional cyber-security costs, and grow organizational cyber resilience.

As described in further detail herein, the agile security platform of the present disclosure provides for discovery of IT/OT supporting elements within an enterprise, which elements can be referred to as configuration items (CI). Further, the agile security platform can determine how these CIs are connected to provide a CI network topology. In some examples, the CIs are mapped to processes and services of the enterprise, to determine which CIs support which services, and at what stage of an operations process. In this manner, a services CI topology is provided.

In some implementations, the specific vulnerabilities of each CI are determined, and enable a list of risks to be mapped to the specific IT/OT network of the enterprise. Further, the agile security platform of the present disclosure can determine what a malicious user (hacker) could do within the enterprise network, and whether the malicious user can leverage additional elements in the network such as scripts, CI configurations, and the like. Accordingly, the agile security platform enables analysis of the ability of a malicious user to move inside the network, namely, lateral movement within the network. This includes, for example, how a malicious user could move from one CI to another CI, what CI (logical or physical) can be damaged, and, consequently, damage to a respective service provided by the enterprise.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client device 102 over the network 106). In accordance with implementations of the present disclosure, and as noted above, the server system 108 can host an agile security platform.

In the example of FIG. 1, an enterprise network 120 is depicted. The enterprise network 120 represents a network implemented by an enterprise to perform its operations. In some examples, the enterprise network 120 represents on-premise systems (e.g., local and/or distributed), cloud-based systems, and/or combinations thereof. In some examples, the enterprise network 120 includes IT systems and OT systems. In general, IT systems include hardware (e.g., computing devices, servers, computers, mobile devices) and software used to store, retrieve, transmit, and/or manipulate data within the enterprise network 120. In general, OT systems include hardware and software used to monitor and detect or cause changes in processes within the enterprise network 120.

In some implementations, the agile security platform of the present disclosure is hosted within the server system 108, and monitors and acts on the enterprise network 120, as described herein. More particularly, and as described in further detail herein, the agile security platform detects IT/OT assets and generates an asset inventory and network maps, as well as processing network information to discover vulnerabilities in the enterprise network 120. Further, the agile security platform provides a holistic view of network and traffic patterns. In some examples, the enterprise network 120 includes multiple assets. Example assets include, without limitation, users 122, computing devices 124, electronic documents 126, and servers 128.

In some implementations, the agile security platform provides one or more dashboards, alerts, notifications and the like to cyber-security personnel that enable the cyber-security personnel to react to and remediate security relevant events. For example, the user 112 can include a cyber-security expert that views and responds to dashboards, alerts, and/or notifications of the agile security platform using the client device 102.

In accordance with implementations of the present disclosure, the agile security platform operates over multiple phases. Example phases include an asset discovery, anomaly detection, and vulnerability analysis phase, a cyber resilience risk analysis phase, and a cyber resilience risk recommendation phase.

With regard to the asset discovery, anomaly detection, and vulnerability analysis phase, discovering what vulnerabilities exit across the vertical stack and the relevant use cases is imperative to be conducted from the enterprise IT to the control systems. A focus of this phase is to generate the security backlog of issues, and potential remediations.

Rather than managing each technology layer separately, the agile security platform of the present disclosure addresses lateral movements across the stack. Through devices, communication channels (e.g., email), and/or operation systems, vulnerabilities are addressed within the context of a service (e.g., a service that the enterprise offers to customers), and a cyber kill chain to a target in the operation vertical, generating operation disturbance by manipulation of data. The notion of a CI assists in mapping dependencies between IT elements within a configuration management DB (CMDB). A so-called security CI (SCI) maps historical security issues of a certain managed security element and is mapped into a security aspect of a digital twin.

As a result, a stack of technologies is defined, and is configured in a plug-in reference architecture (replaceable and extensible) manner. The stack addresses different aspects of monitoring, harvesting, and alerting of information within different aggregations views (dashboards) segmented according to owners and relevant IT and security users. An example view includes a health metric inserted within the dashboard of an enterprise application. In some examples, the health metric indicates the security condition of the underlying service and hence, the reliability of the provided data and information. Similar to risks that can be driven by labor, inventory, or energy, security risk concern can be presented and evaluated in the operations-level, drilled-through for additional transparency of the issue, and can be optimally remediated by allocating investments to automation or to security and IT personal with adequate operations awareness.

With regard to the cyber resilience risk analysis phase, each vulnerability may have several remediations, and each has a cost associated with it, either per internal personnel time, transaction, service, or retainer, as well as the deferred cost of not acting on the issue. A focus of this phase is to enable economical decision-making of security investments, either to be conducted by the IT and security team or directly by automation, and according to risk mitigation budget.

In further detail, observing a single-issue type and its remediations does not reflect the prioritization between multiple vulnerabilities. Traditional systems are based on global risk assessment, yet the context in which the SCI is part of is missing. The overall risk of a process matters differently for each enterprise. As such, remediation would occur according to gradual hardening of a process according to prioritization, driven in importance and responsibility by the enterprise, not by gradual hardening of all devices, for example, in the organization according to policy, without understanding of the impact on separated operational processes. Hardening of a system should be a decision of the enterprise to drive security alignment with the enterprise.

In addition, as the system is changed by gradual enforcement and hardening, new issues are detected and monitored. Hence, making a big bang decision may be not relevant to rising risks as they evolve. Prioritization according to value is the essence of this phase. It is a matter of what is important for the next immediate term, according to overall goals, yet considering changes to the environment.

With regard to the cyber resilience risk recommendation phase, a focus is to simplify approved changes and actions by proactive automation. In traditional systems, the action of IT remediation of security issues is either done by the security team (such as awareness and training), by creating a ticket in the IT service system (call for patch managements), and/or by tools that are triggered by security and monitored by IT (automatic deployment of security policies, change of authentication and authorization, self-service access control management, etc.). Some operations can be conducted in a disconnected mode, such as upgrading firmware on an IoT device, in which the operator needs to access the device directly. Either automated or manual, by IT or by security, or by internal or external teams, the entire changes are constantly assessed by the first phase of discovery phase, and re-projected as a metric in a context. Progress tracking of these changes should also occur in a gradual manner, indicating maintenance scheduling on similar operational processes, hence, driving recommendations for frequent actions that can be automated, and serve as candidates to self-managed by the operations owners and systems users.

In the agile security platform of the present disclosure, acting is more than automating complex event processing (CEP) rules on alerts captured in the system logs and similar tools. Acting is started in areas highlighted according to known patterns and changing risks. Pattern detection and classification of events for approved automation processes (allocated transactions budget), are aimed at commoditization of security hardening actions in order to reduce the attention needed for prioritization. As such, a compound backlog and decision phase, can focus further on things that cannot be automated versus those that can. All issues not attended yet are highlighted, those that are handled by automation are indicated as such, and monitored to completion, with a potential additional value of increasing prioritization due to changing risks impact analysis.

Figure 2:
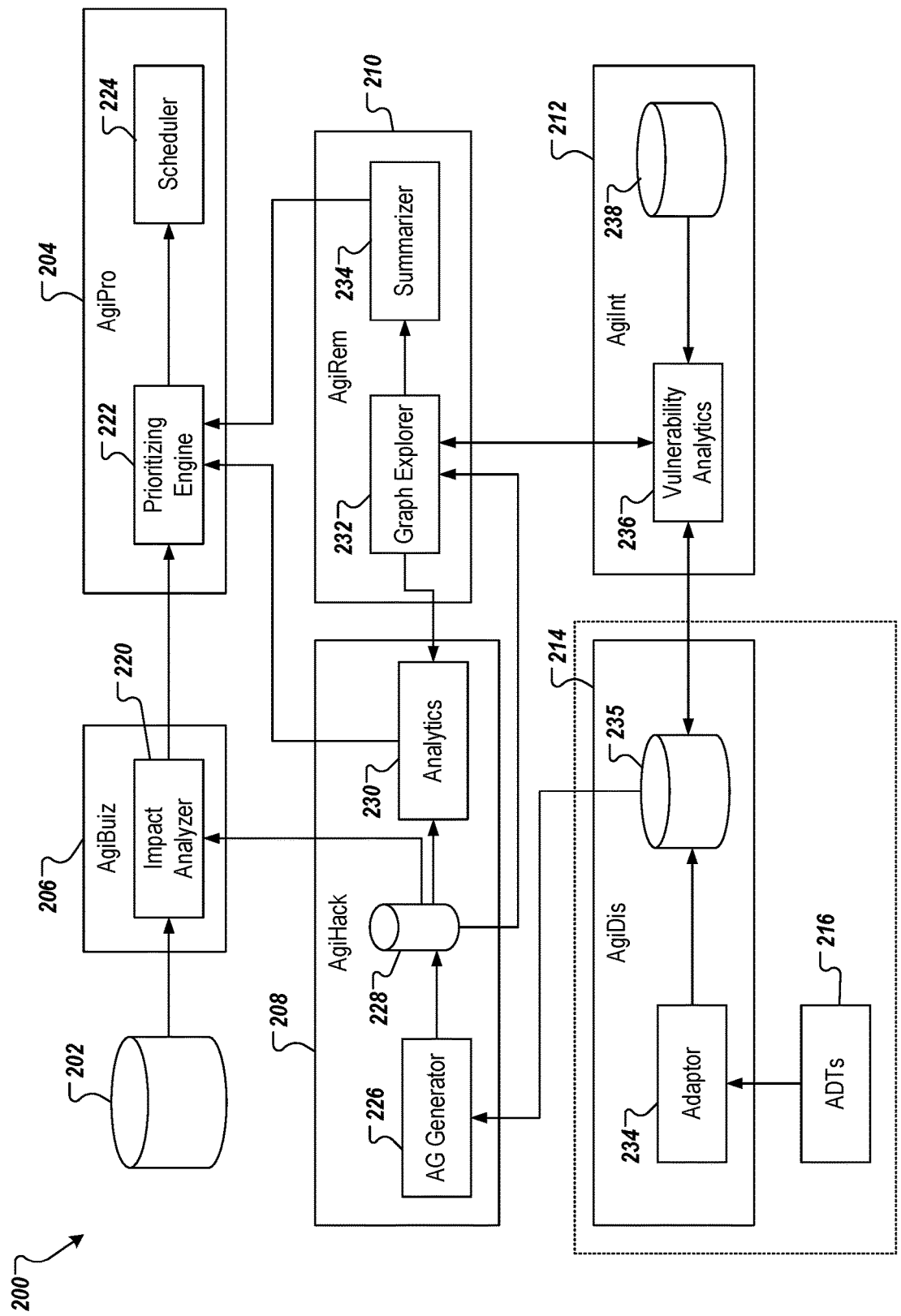
FIG. 2 depicts an example conceptual architecture of an agile security platform of the present disclosure.

FIG. 2 depicts an example conceptual architecture 200 of an agile security (AgiSec) platform in accordance with implementations of the present disclosure. The conceptual architecture 200 depicts a set of security services of the AgiSec platform, which include: an agile security prioritization (AgiPro) service 204, an agile security business impact (AgiBuiz) service 206, an agile security remediation (AgiRem) service 210, an agile security hacker lateral movement (AgiHack) service 208, an agile security intelligence (AgiInt) service 212, and an agile security discovery (AgiDis) service 214. The conceptual architecture 200 also includes an operations knowledge base 202 that stores historical data provided for an enterprise network (e.g., the enterprise network 120).

In the example of FIG. 2, the AgiDis service 214 includes an adaptor 234, and an asset/vulnerabilities knowledge base 235. In some examples, the adaptor 234 is specific to an asset discovery tool (ADT) 216. Although a single ADT 216 is depicted, multiple ADTs can be provided, each ADT being specific to an IT/OT site within the enterprise network. Because each adaptor 234 is specific to an ADT 216, multiple adaptors 234 are provided in the case of multiple ADTs 216.

In some implementations, the AgiDis service 214 detects IT/OT assets through the adaptor 234 and respective ADT 216. In some implementations, the AgiDis service 214 provides both active and passive scanning capabilities to comply with constraints, and identifies device and service vulnerabilities, configuration problems, and aggregate risks through automatic assessment. The discovered assets can be used to generate an asset inventory, and network maps. In general, the AgiDis service 214 can be used to discover assets in the enterprise network, and a holistic view of network and traffic patterns. More particularly, the AgiDis service 214 discovers assets, their connectivity, and their specifications and stores this information in the asset/vulnerabilities knowledge base 235. In some implementations, this is achieved through passive network scanning and device fingerprinting through the adaptor 234 and ADT 216. The AgiDis service 214 provides information about device models.

In the example of FIG. 2, the AgiInt service 212 includes a vulnerability analytics module 236 and a threat intelligence knowledge base 238 (e.g., CVE, CAPEC, CWE, iDefence API, vendor-specific databases). In some examples, the AgiInt service 212 discovers vulnerabilities in the enterprise network based on data provided from the AgiDis service 214. In some examples, the vulnerability analytics module 236 processes data provided from the AgiDis service 214 to provide information regarding possible impacts of each vulnerability and remediation options (e.g., permanent fix, temporary patch, workaround) for defensive actions. In some examples, the vulnerability analytics module 236 can include an application programming interface (API) that pulls out discovered vulnerabilities and identifies recommended remediations using threat intelligence feeds. In short, the AgiInt service 212 maps vulnerabilities and threats to discovered IT/OT assets. The discovered vulnerabilities are provided back to the AgiDis service 214 and are stored in the asset/vulnerabilities knowledge base 235 with their respective assets.

In the example of FIG. 2, the AgiHack service 208 includes an attack graph (AG) generator 226, an AG database 228, and an analytics module 230. In general, the AgiHack service 208 constructs AGs and evaluates hacking exploitation complexity. In some examples, the AgiHack service 208 understands attack options, leveraging the vulnerabilities to determine how a hacker would move inside the network and identify targets for potential exploitation. The AgiHack service 208 proactively explores adversarial options and creates AGs representing possible attack paths from the adversary's perspective.

In further detail, the AgiHack service 208 provides rule-based processing of data provided from the AgiDis service 214 to explore all attack paths an adversary can take from any asset to move laterally towards any target (e.g., running critical operations). In some examples, multiple AGs are provided, each AG corresponding to a respective target within the enterprise network. Further, the AgiHack service 208 identifies possible impacts on the targets. In some examples, the AG generator 226 uses data from the asset/vulnerabilities knowledge base 236 of the AgiDis service 214, and generates an AG. In some examples, the AG graphically depicts, for a respective target, all possible impacts that may be caused by a vulnerability or network/system configuration, as well as all attack paths from anywhere in the network to the respective target. In some examples, the analytics module 230 processes an AG to identify and extract information regarding critical nodes, paths for every source-destination pair (e.g., shortest, hardest, stealthiest), most critical paths, and critical vulnerabilities, among other features of the AG. If remediations are applied within the enterprise network, the AgiHack service 208 updates the AG.

In the example of FIG. 2, the AgiRem service 210 includes a graph explorer 232 and a summarizer 234. In general, the AgiRem service 210 provides remediation options to avoid predicted impacts. For example, the AgiRem service 210 provides options to reduce lateral movement of hackers within the network and to reduce the attack surface. The AgiRem service 210 predicts the impact of asset vulnerabilities on the critical processes and adversary capabilities along kill chain/attack paths and identifies the likelihood of attack paths to access critical assets and prioritizes the assets (e.g., based on shortest, easiest, stealthiest). The AgiRem service 210 identifies remediation actions by exploring attack graph and paths.

In further detail, for a given AG (e.g., representing all vulnerabilities, network/system configurations, and possible impacts on a respective target) generated by the AgiHack service 208, the AgiRem service 210 provides a list of efficient and effective remediation recommendations using data from the vulnerability analytics module 236 of the AgiInt service 212. In some examples, the graph explorer 232 analyzes each feature (e.g., nodes, edges between nodes, properties) to identify any condition (e.g., network/system configuration and vulnerabilities) that can lead to cyber impacts. Such conditions can be referred to as issues. For each issue, the AgiRem service 210 retrieves remediation recommendations and courses of action (CoA) from the AgiInt service 212, and/or a security knowledge base (not shown). In some examples, the graph explorer 232 provides feedback to the analytics module 230 for re-calculating critical nodes/assets/paths based on remediation options. In some examples, the summarizer engine 234 is provided as a natural language processing (NLP) tool that extracts concise and salient text from large/unstructured threat intelligence feeds. In this manner, the AgiSec platform can convey information to enable users (e.g., security teams) to understand immediate remediation actions corresponding to each issue.

In the example of FIG. 2, the AgiBuiz service 206 includes an impact analyzer 220. In general, the AgiBuiz service 206 associates services that are provided by the enterprise with IT/OT assets, generates a security map, identifies and highlights risks and possible impacts on enterprise operations and industrial processes, and conducts what-if prediction analyses of potential security actions remediations on service health levels. In other words, the AgiBuiz service 206 identifies risk for each impact predicted by the AgiHack service 208. In some examples, the impact analyzer 220 interprets cyber risks and possible impacts (e.g., financial risk) based on the relative importance of each critical asset and its relative value within the entirety of the enterprise operations. The impact analyzer 220 processes one or more models to compare the financial risks caused by cyber attacks with those caused by system unavailability due to shutdown time for replacing/patching critical assets.

In the example of FIG. 2, the AgiPro service 204 includes a prioritizing engine 222 and a scheduler 224. In some implementations, the AgiPro service 204 prioritizes the remediation recommendations based on their impact on the AG size reduction and risk reduction on the value. In some examples, the AgiPro service 204 determines where the enterprise should preform security enforcement first, in order to overall reduce the risks discovered above, and evaluate and probability to perform harm based on the above lateral movements by moving from one CI to another. In some examples, the AgiPro service 204 prioritizes remediation actions based on financial risks or other implications, provides risk reduction recommendations based on prioritized remediations, and identifies and tracks applied remediations for risks based on recommendations.

In some examples, the prioritizing engine 222 uses the calculated risks (e.g., risks to regular functionality and unavailability of operational processes) and the path analysis information from the analytics module 230 to prioritize remediation actions that reduce the risk, while minimizing efforts and financial costs. In some examples, the scheduler 224 incorporates the prioritized CoAs with operational maintenance schedules to find the optimal time for applying each CoA that minimizes its interference with regular operational tasks.

In the context of cyber security, a critical node, also referred to herein as cardinal node, can represent a CI that is a key junction for lateral movements within a segmented network. Namely, once acquired as a target, the cardinal node can trigger multiple new attack vectors. Cardinal nodes can also be referred to as "cardinal faucet nodes." Another node will be one that many hackers' lateral movements can reach, yet it cannot lead to an additional node. Such nodes can be referred to as "cardinal sink nodes." In the network graph, the more edges from a cardinal faucet node to other nodes, the higher the faucet attribute is. The more incoming edges to a cardinal node, the higher the sink attribute is. If a node has both sink and faucet values in correlation, the more overall cardinal this node becomes to the entire examined graph topology and is defined as a critical target to be acquired since it provides control over multiple nodes in the graphs. In certain situations, the search for a faucet attribute is more important than a sink attribute. Such as a case of finding what node to block first to prevent a segregation of an attack outbreak. In case of finding what is very hard to protect, the more sink attributes matter more.

Figure 3:
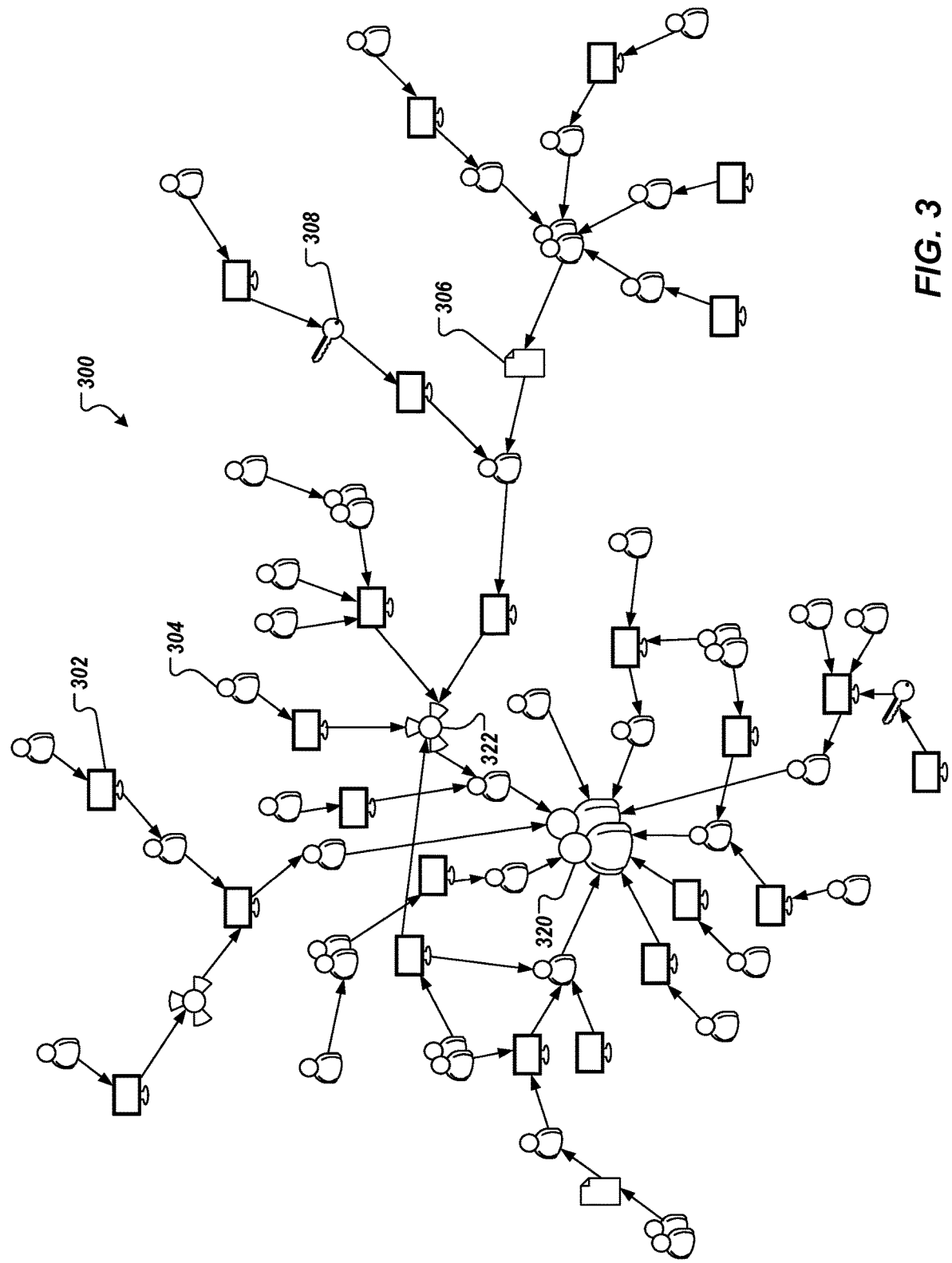
FIG. 3 depicts an example attack graph in accordance with implementations of the present disclosure.

FIG. 3 depicts an example portion 300 of an AG in accordance with implementations of the present disclosure. In some implementations, an AG is provided based on the network topology of the enterprise network. For example, the AgiHack service 208 of FIG. 2 can generate one or more AGs based on information provided from the AgiDis service 214. In some examples, an AG includes nodes and edges (also referred to as arches) between nodes. In some examples, a node can be associated with a semantic type. In the example domain of cyber-security and network topology, example semantic types can include, without limitation, computer 302, user 304, file 306, and key 308.

In some examples, an edge can include an incoming (sink) edge (e.g., an edge leading into a node from another node) or an outgoing (faucet) edge (e.g., an edge leading from a node to another node). In some examples, each edge can be associated with a respective activity. In the example domain of cyber-security and network topology, example activities can include, without limitation, logon (credentials), operating system access, and memory access. In some examples, each edge can be associated with a respective weight. In some examples, the weight of an edge can be determined based on one or more features of the edge. Example features can include a traffic bandwidth of the edge (e.g., how much network traffic can travel along the edge), a speed of the edge (e.g., how quickly traffic can travel from one node to another node along the edge), a difficulty to use the edge (e.g., network configuration required to use the edge), and a cost to use the edge (e.g., in terms of technical resources, or financial cost). In some examples, and as described in further detail below, the weights of the edges are determined relative to each other (e.g., are normalized to 1).

In some implementations, each node can be associated with a set of attributes. Example attributes can include, without limitation, the semantic type of the node, a number of incoming edges, a number of outgoing edges, a type of each of the edges, a weight of each of the edges, and the like. In some implementations, one or more values for a node can be determined based on the set of attributes of the node, as described in further detail herein.

The example portion 300 of the AG includes tens of nodes (approximately 70 nodes in the example of FIG. 3). It is contemplated, however, that an AG can include hundreds, or thousands of nodes. In some examples, the example portion 300 of the AG is a visualization of part of the AG based on one or more filter parameters. In some examples, a user can define filter parameters that can be used to identify cardinal nodes within an AG, and segments of the AG that may be relevant to a cardinal node. In general, segments of the AG can be based on actual network segments based on subnetworks, VLANs, geographically dispersed enterprise networks, and the like. In these cases, the AG generator can generate separate AGs (one per segment) or create one comprehensive AG and visualize the comprehensive AG in multiple segments based on the criteria described herein. In the example of FIG. 3, a node 320 can be determined to be a cardinal node based on one or more filter parameters (e.g., no outgoing edges, and more than three incoming edges). In some examples, other depicted nodes include nodes along lateral paths that lead to a cardinal node.

In the example of FIG. 3, the node 320 can represent administrator credentials, a relatively high-value target within an enterprise network, and all other edges and nodes define the paths within the AG that lead to the node 320. While the AG can include hundreds, or thousands of nodes and edges, the example portion 300 is provided based on identification of the node 320 as the cardinal node (e.g., based on filter parameters) and all paths of the AG that lead to the node 320. In this manner, the portion 320 provides a more easily consumable visualization than depicting an entirety of the AG.

In some implementations, other nodes besides the cardinal node can be identified as relatively important nodes (e.g., relative to other depicted nodes). In some examples, the relative importance of a node can be determined based on attack paths that lead to a cardinal node. In the example of FIG. 3, a node 322 can be determined to be a relatively important node. Starting from the node 322, there is a single hop (a single attack path with one hop) to the node 320. However, there are approximately ten different attack paths that the node 322 is included in. Consequently, security resources could be concentrated on the node 322, as opposed to nodes upstream of the node 322 in the multiple attack paths. In this manner, security resources can more efficiently protect the node 320, as described in further detail herein.

Further, AGs can change over time. That is, there is a multi-dimensional aspect to AGs with one dimension including time. For example, and with continued reference to the example of FIG. 3, the node 320 can be considered a cardinal node based on the filter parameters. At another time, the node 320 might no longer be considered a cardinal node. For example, between the first time and the second time, values of attributes may have changed for nodes, some nodes may have been removed from the network (e.g., computers retired, users removed), and/or some nodes may have been added to the network (e.g., new computers/users). As one non-limiting example, new vulnerabilities may have been discovered after the first time, which definitively changes the AG as generated at the second time.

As introduced above, and in accordance with implementations of the present disclosure, the AgiSec platform of the present disclosure provides a physical AG from an analytical AG, and use the physical AG to determine optimal remediations (also referred to herein as fixes). The agile security platform further provides for scheduling of the remediations.

Figure 4:
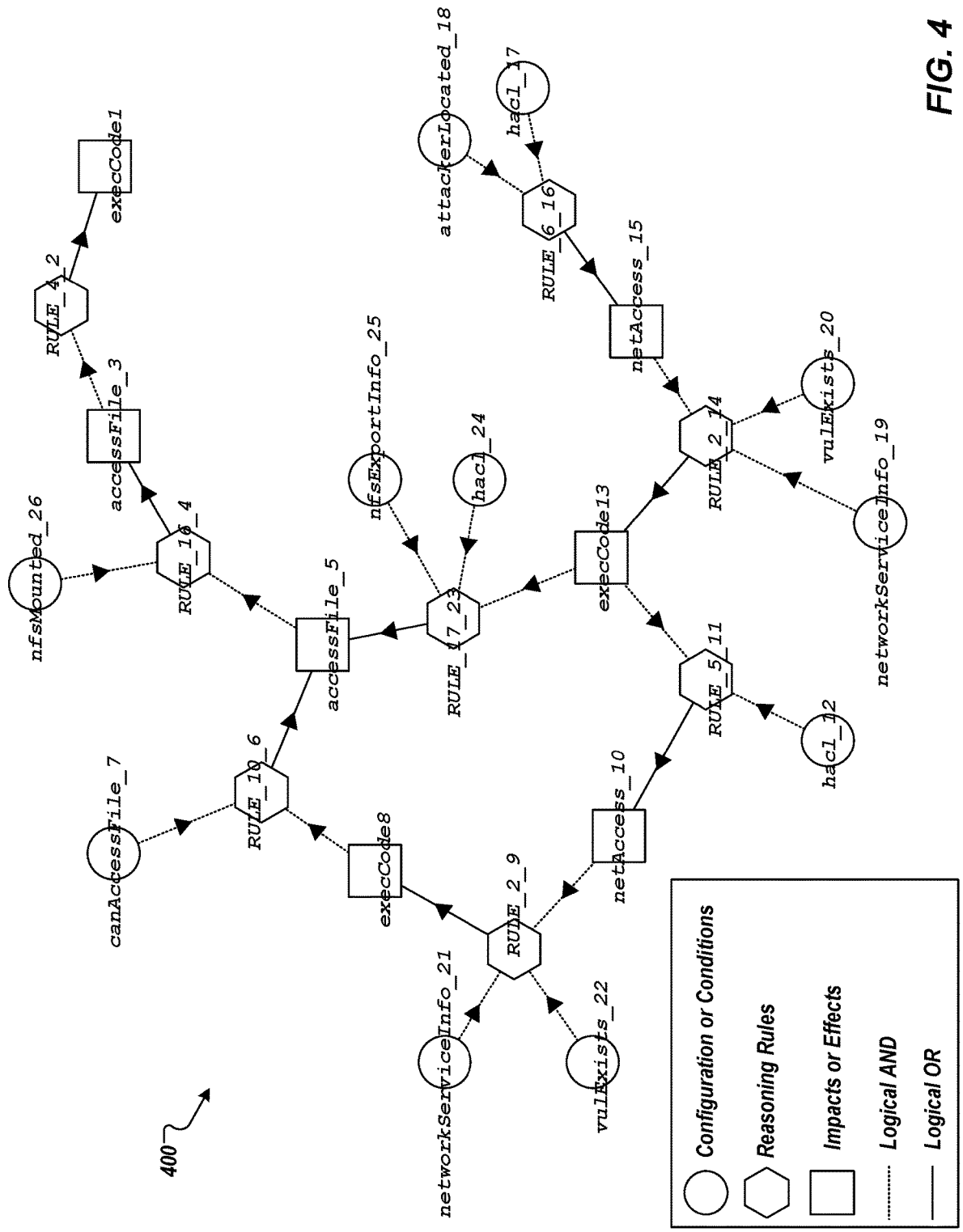
FIG. 4 depicts an example portion of an example attack graph to illustrate implementations of the present disclosure.

FIG. 4 depicts an example portion 400 of an example attack graph to illustrate implementations of the present disclosure. As depicted in the example of FIG. 4, the AG, which can also be referred to as an analytical AG, can include different node types to show how a set of network and system configurations result in unauthorized actions to specific targets. The example portion 400 is depicted in a database structure (e.g., Neo4j graph database structure). Nodes in an AG are of different types: circular nodes representing system or network configurations that are the conditions that provide possibilities for actions by an attacker; hexagonal nodes representing reasoning rules that represent the attack methodology leveraged by an attacker to achieve a particular goal; and square nodes that represent an impact as a sub-goal for a certain action an attacker could take. The AG includes two types of edges: configuration-to-rule edges that represent logical AND (i.e., all configuration conditions have to be true to cause the impact; and rule-to-impact edges that represent logical OR (i.e., the impact happens if at least one rule is satisfied).

In general, the AG is created by taking into account the configurations directed by some rules in order to make some impacts on the target network. In some examples, all configuration nodes, impact nodes, and rule nodes can be provided in sets C, I, R, respectively. Accordingly, $C=\{c_j|c_j \in V, \forall c_j \text{ is a configuration}\}$, $I=\{i_j|i_j \in V, \forall i_j \text{ is an impact}\}$, and $R=\{r_j|r_j \in V, \forall r_j \text{ is a rule}\}$. Consequently, the combination of these sets accounts for all vertices of the graph G (i.e., $V=\{C, I, R\}$).

Figure 5A:
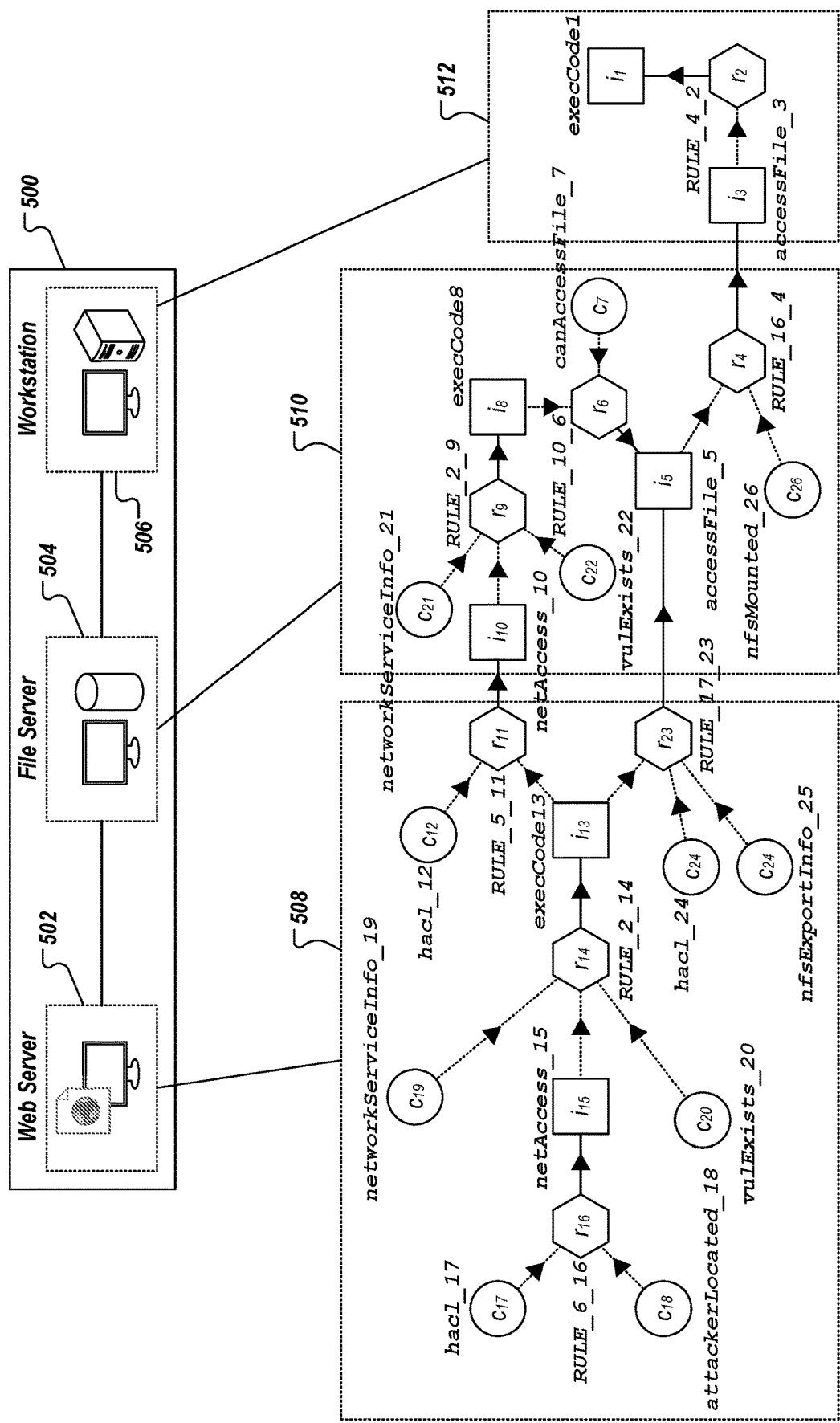
FIGS. 5A and 5B depict an example conversion of an analytical attack graph to a physical attack graph in accordance with implementations of the present disclosure.
Figure 5B:
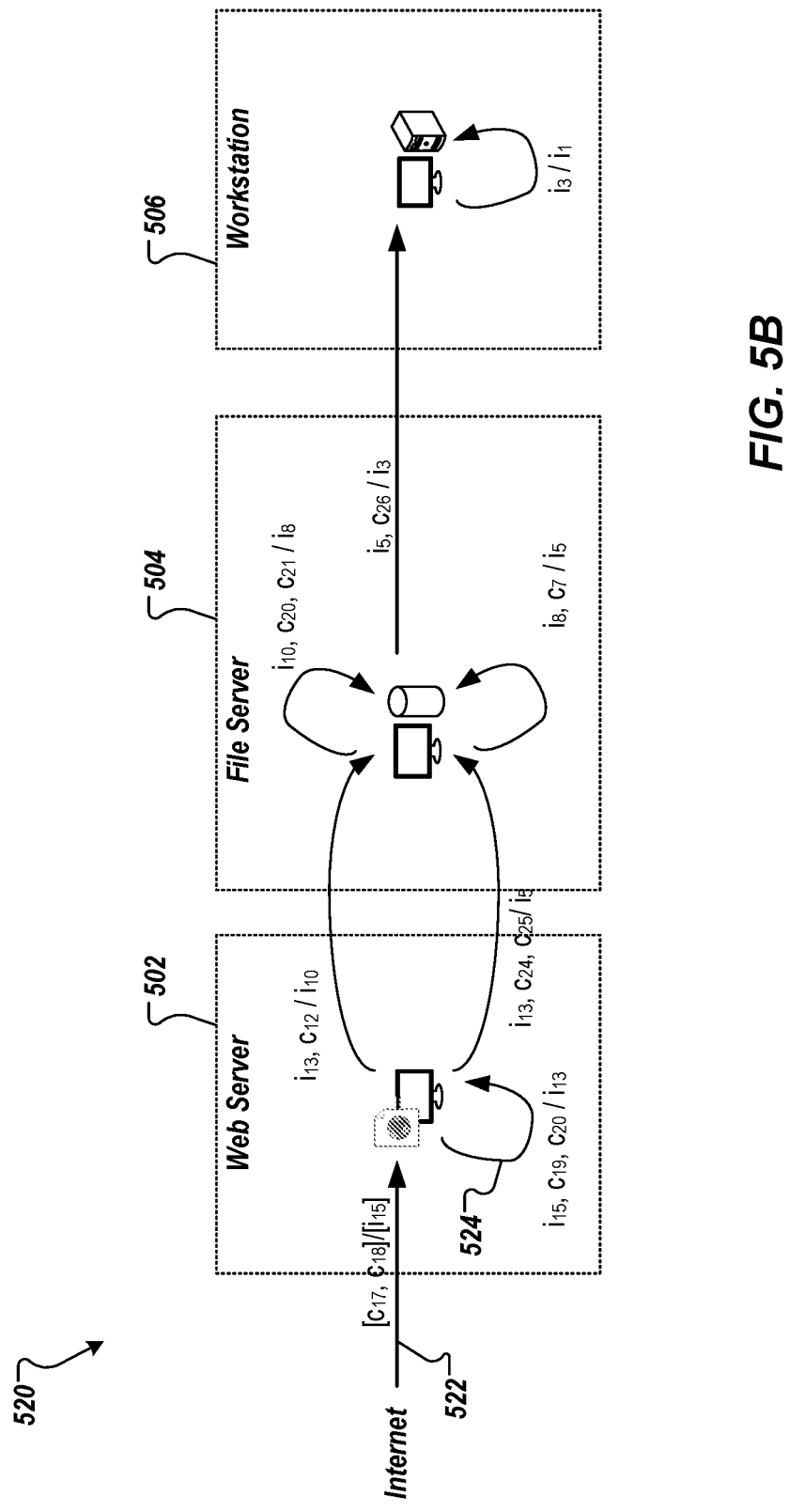

As introduced above, implementations of the present disclosure provide for conversion of an analytical AG to a physical AG. FIGS. 5A and 5B depict an example conversion of an analytical AG to a physical AG in accordance with implementations of the present disclosure. The example of FIGS. 5A and 5B is based on the example analytical AG of FIG. 4. In some implementations, conversion of the analytical AG to the physical AG includes grouping of configuration nodes, impact nodes, and rule nodes to respective physical environments of an enterprise network 500. In some examples, a physical environment is a network device on which a configuration, an impact, and/or a rule is applied that can enable an attacker to move through the enterprise network. In the example of FIGS. 5A and 5B, example physical environments include a web server 502, a file server 504, and a workstation 506.

With particular reference to FIG. 5A, a web server group 508, a file server group 510, and a workstation group 512 are defined and are populated with respective sub-sets of configuration nodes, impact nodes, and rule nodes. The sub-sets of nodes within each of the web server group 508, the file server group 510, and the workstation group 512 define potential movements within a respective physical environment, as well as potential movements between physical environments. For example, if the rule $r_{14}$ is satisfied, an attacker can move to the impact $i_{13}$ (e.g., execCode (attacker, webserver, user)) within the web server 502. As another example, if either the rule $r_{11}$ or the rule $r_{23}$ is satisfied, an attacker can move from the web server 502 to the impact $i_5$ (e.g., accessFile (fileserver, write, /export)) on the file server 504. As still another example, if the rule $r_4$ is satisfied, an attacker can move to the impact $i_3$ (e.g., accessFile(workstation, write, /user/local/share)) on the workstation 506.

With particular reference to FIG. 5B, a simplified physical AG 520 is depicted, which includes the web server 502, the file server 504, and the workstation 506 of FIG. 5A. The physical AG 520 provides a graphical representation of actions that can result in impacts to enable an attacker to move through the enterprise network (e.g., from the Internet to a particular work station). In some examples, an action is provided as an action vector that requires one or more configurations and/or impacts as preconditions that need to be (logically) true for the action to occur. In some examples, an impact is provided as a vector that is caused by an attacker by taking an action. For example, an action 522 (e.g., an edge between nodes) can be provided to cause the impact $i_{15}$. Respective vectors can be provided as:

$A=[c_{17},c_{18}]/[i15]=$[hacl(internet,webserver,$TCP$,80), attackerLocated(attacker,internet)]/[netAccess (attacker,webserver,$TCP$,80)]

$I=[i_{15}]=$[netAccess(attacker,webserver,$TCP$,80)]

Accordingly, the action 522 represents movement from the Internet into the enterprise network through the web server 502. That is the action 522 represents node-to-node movement. The notation of the action 522 ($[c_{17}, c_{18}]/[i15]$) provides the contextual information as to dependencies (e.g., hacl (internet, webserver, TCP, 80), attackerLocated (attacker, internet) occurring to result in netAccess (attacker, webserver, TCP, 80)).

As another example, an action 524 can be considered, which represents a self-link within the web server 502. That is, the action 524 represents node-to-itself movement. An example of this can include, without limitation, escalation of privileges within the web server 502 for eventual movement to the file server 504. For the action 524, respective vectors can be provided as:

$A=[c_{19},c_{20}]/[i_{13}]=$[networkService(webserver,httpd, $TCP$,80,apache),vulExist(192.168.1.1,httpd, $CVE$)]/[execCode(attacker,webserver,user)]

$I=[i_{13}]=$[execCode(attacker,webserver,user)]

where the action 524 is dependent on the impact $i_{15}$ occurring.

In accordance with implementations of the present disclosure, physical AGs, such as the physical AG 520 of FIG. 5B, provide visualization that more accurately depict enterprise networks in terms of physical infrastructure. Further, a physical AG depicts a single version of assets within the enterprise network without losing information from the underlying analytical attack graph that the physical AG is based on, where details (e.g., the vectors) on each edge show the configurations and the impacts discerned from the analytical attack graph. In this manner, the physical AG depicts all actions without losing any information, while mapping to a physical graph that enables clearer understanding of possible movement through the enterprise network.

Implementations of the present disclosure also provide recommendations for remediations (also referred to herein as fixes). In some implementations, a remediation nullifies one or more pre-conditions (e.g., one or more configurations) that are required for an impact to occur. In this manner, occurrence of the impact is prevented. In some implementations, the AgiSec platform of the present disclosure can determine one or more CIs that impact a particular process, and, for each CI, a set of fixes (a set of remediations) can be defined. That is, for example, a CI can correspond to an impact and a set of fixes can be identified based on that information. In some examples, fixes in the set of fixes are determined from one or more threat intelligence feeds. For example, and as described above, the AgiBuiz service 204 of FIG. 2 associates services (e.g., process) that are provided by the enterprise with IT/OT assets (CIs), generates a security map, identifies and highlights risks and possible impacts on enterprise operations and industrial processes, and conducts what-if prediction analyses of potential security actions remediations on service health levels. This information can be used to determine a set of fixes based on threat intelligence information, such as that provided from the threat intelligence knowledge base 238 of FIG. 2.

In accordance with implementations of the present disclosure, remediation optimization is provided. In some implementations, a minimum remediation action is provided to maximize risk reduction. In some examples, a remediation action can include applying one or more fixes to nullify potential occurrence of one or more impacts. In general, and as described in further detail herein, the remediation optimization of the present disclosure determines where remediations should be applied to remove the largest network issues, in terms of cost and risk, given the impacts provided in an analytical AG.

Figure 6:
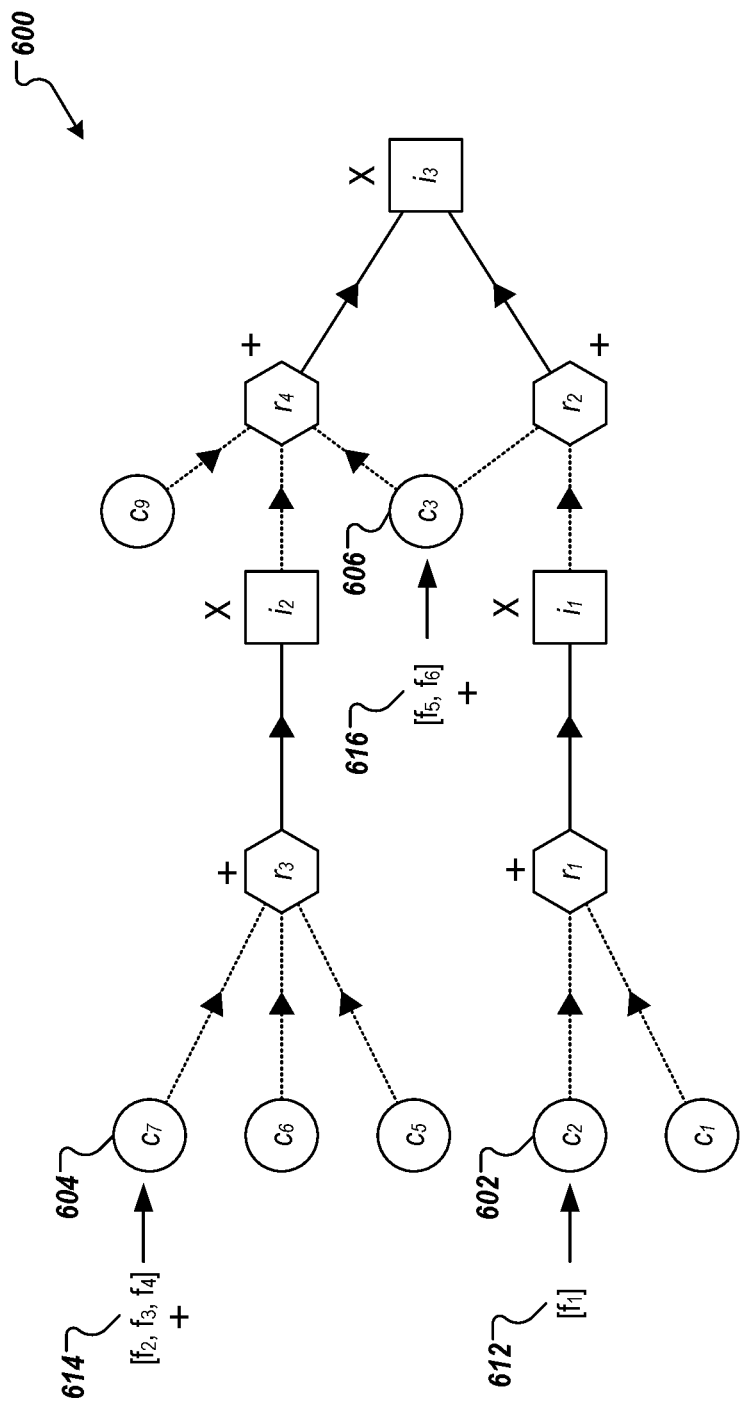
FIG. 6 depicts example remediations to reduce cyber-risks in enterprise networks in accordance with implementations of the present disclosure.

FIG. 6 depicts example remediations to reduce cyber-risks in enterprise networks in accordance with implementations of the present disclosure. More particularly, FIG. 6 depicts an example analytical AG 600 that includes nodes representing configurations, impacts, and rules, as described herein. In the example of FIG. 6, nodes 602, 604, 606 represent configurations that are associated with a process of an enterprise. In accordance with implementations of the present disclosure, respective sets of fixes 612, 614, 616 can be provided for the configurations (i.e., represented by the nodes 602, 604, 606).

In some implementations, a configuration is cross-referenced with a threat intelligence knowledge base, which can provide one or more fixes associated with the respective configuration. In some examples, the threat intelligence knowledge base can identify one or more types of fixes for a configuration. Example types of fixes include an official fix (e.g., a fix that wholly resolves a vulnerability (improper configuration)), a work-around (e.g., a fix that works around the vulnerability, but does not completely resolve the vulnerability), and a temporary (e.g., a fix that only temporarily resolves a vulnerability). In some implementations, a set of fixes includes one or more fixes. For example, the set of fixes 612 includes a single fix, while the sets of fixes 604, 606 each includes multiple fixes. In some examples, a set of fixes can include multiple types of fixes (e.g., a set of fixes including an official fix, a work-around fix, and a temporary fix). In some implementations, and in the case of a set of fixes including multiple fixes, a single fix can be selected for remediation. That is, for example, a logical OR can be applied, such that a single fix is selected from a set of fixes. In some examples, each fix can include a set of tasks (e.g., one or more tasks) that are to be performed to execute the fix. In the case of multiple tasks, it can be the case that two or more tasks have to be performed (logical AND) or at least one of task has to be performed (logical OR) to execute the fix.

In some implementations, it can be provided that fixes are linearly independent. That is, any two fixes $f_i$ and $f_j$ do not fix the same issue. In some implementations, it can be provided that there is no causality between the impacts. That is, if one impact occurs, it cannot definitely cause another impact to occur without additional effort on the part of an attacker. For example, in real-world networks, even if one impact (e.g., $i_2$) depends only on another impact (e.g., $i_1$) without any other required condition, it cannot be definitively said that the dependent impact will definitely occur if the earlier impact has occurred, because some effort from attacker may still be required. In accordance with implementations of the present disclosure, for a situation where an impact directly and only depends from another impact (e.g., $i_2$ depends on i1), the impacts are considered equal in mathematic formulation (e.g., $i_1=i_2$), and whatever fixes needed to nullify the first impact will also nullify the second impact.

In accordance with implementations of the present disclosure, a problem formulations is provided with one or more objectives, and, for each objective, an optimization problem can be defined. In the example of FIG. 6, it can be determined that all impacts are to be addressed (e.g., nullify all impacts) or that one or more particular impacts are to be addressed (e.g., nullify one or more impacts). To achieve this, implementations of the present disclosure provide for mathematical formulations to convert the analytical AG. In some implementations, for fixes, a logical OR is converted to sum (+). For example, for a set of fixes having multiple fixes, the logical OR is converted to sum (+). In some implementations, for rules and impacts, logical AND is converted to sum (+) and logical OR is converted to multiply (×). In this manner, implementations of the present disclosure enable logical relationships to be converted to mathematical relationships.

For each fix, a respective cost (w) and a respective time (t) provided. In some examples, cost can be defined in terms of monetary, time (temporal), and/or resources (e.g., technical resources required to implement the fix). In some examples, the time indicates a waiting time until the respective fix can be applied. In some implementations, a risk value (Risk) is provided and indicates a risk to the enterprise, if a respective impact is not nullified. In some implementations, optimization include cost optimization in terms of cost and risk.

By way of non-limiting illustration, the example analytical AG 600 of FIG. 6 can be considered. By applying the transformations above, the following mathematical relationships are provided:

$$i_3=(c_9+i_2+c_3)\times(c_3+i_1+c_4)$$

$$i_2=c_5+c_6+c_7$$

$$i_1=c_1+c_2$$

$$c_j=\Sigma f_k$$

Accordingly, for the impact $i_3$, there are two paths: a first path from $i_1$ and a second path from $i_2$. Further, in the relationships above, values provided for the configurations are provided in terms of a cost value representative of the respective cost (w). For example, in the relationship $i_3=(c_9+i_2+c_3)\times(c_3+i_1+c_4)$: $c_9$ is a cost of implementing a fix to $c_9$ (e.g., zero as no fix is depicted for $c_9$ in FIG. 6), $i_2$ is a cost of nullifying $i_2$ by applying a fix to $c_5$, $c_6$, or $c_7$ (e.g., a non-zero value, because a set of fixes is provided for $c_7$), $c_3$ is a cost of implementing a fix to $c_3$ (e.g., a non-zero value, because a set of fixes is provided for $c_3$), and so on.

In considering an example objective of nullifying all impacts, the cost optimization problem becomes:

Minimize: $\Sigma f_k \cdot w_k$ and $\Sigma t_k \cdot$Risk $$i_3=(c_9+i_2+c_4)\times(c_4+i_1+c_3)$$

$$i_1=c_1+c_2$$

$$i_2=c_5+c_6+c_7$$

$$c_j=\Sigma f_k \cdot w_k$$

Subject to:

$i_1, i_2, i_3 \geq 1$ (i.e., there is a fix for each impact)

$f_k=[0,1]$

In considering an example objective of nullifying a single impact (e.g., $i_3$), the cost optimization problem becomes:

Minimize: $\Sigma f_k \cdot w_k$ and $\Sigma t_k \cdot$Risk $$i_3=(c_9+i_2+c_4)\times(c_4+i_1+c_3)$$

$$i_1=c_1+c_2$$

$$i_2=c_5+c_6+c_7$$

$$c_j=\Sigma f_k \cdot w_k$$

Subject to:

$i_3 \geq 1$ (i.e., there is a fix for impact $i_3$)

$f_k=[0,1]$

In some implementations, a total cost is based on the cost and the risk. Minimization of the total cost can be formulated as:

$$\text{Minimize Total Cost}=\text{Minimize}[(pr^*\Sigma t_k^*\text{Risk})+(\Sigma w_k)]$$

In some implementations, after the optimization problem has been formulated, one or more resolution tools can be implemented. Example resolution tools can include, without limitation, an integer linear programming (ILP) solver, a bilevel linear programming (BLP) solver, and a satisfiability (SAT) solver. Such solvers provide optimal results, but are computationally intensive. In some examples, a greedy algorithm can be used to resolve the optimization problem. In general, greedy algorithms provide near-optimal results and a less computationally intensive and more scalable. More generally, a greedy algorithm can be described as an optimization algorithm that makes a locally optimal decision at each step, which is not necessarily optimal for all future steps. Example greedy algorithms can include, without limitation, set cover problem, neighbor joining, nearest neighbor, and Dijkstra's algorithm.

In some implementations, in applying a greedy algorithm in attempting to nullify all impacts, a coverage matrix can be provided, which provides a count of a fix with respect to one or more impacts that the fix addresses. For the example analytical attack graph 600 of FIG. 6, an example coverage matrix can be provided as:

|   | $f_1$ | $f_2$ | $f_3$ | $f_4$ | $f_5$ | $f_6$ |
|---|---|---|---|---|---|---|
| $i_3$ by $i_1$ | * |   |   |   | * | * |
| $i_3$ by i2 |   | * | * | * | * | * |
| $i_2$ |   | * | * | * |   |   |
| $i_1$ | * |   |   |   |   |   |

In some examples, a higher coverage indicates more impacts will be nullified by the respective fix. If there are multiple paths (logical OR) to an impact, that impact appears multiple times in the coverage matrix (e.g., as with $i_3$ above).

In some implementations, the coverage matrix can be converted to a set cover problem to cover (nullify) all impacts with minimum fixes (e.g., $f_i=1$). The set cover problem is a greedy algorithm and can generally be described as, given a universe U of n elements, a collection of subsets of U (e.g., S={$S_1, S_2 ..., S_m$}) is provided, where every subset $S_i$ has an associated cost, a minimum cost sub-collection of S is identified, which covers all elements of U.

It can occur, however, that a tie scenario exists. For example, two or more fixes can be determined to both have a maximum total coverage. In the example coverage matrix above, it can be determined that fixes $f_2, f_3, f_4$ have the maximum total coverage. That is, each addresses the same impacts, so there is a tie between fixes $f_2, f_3, f_4$ in terms of coverage. In such scenarios, a linked impact count (also referred to herein as linked impact) can be determined for each fix. In some examples, a linked impact is determined as a number of impacts that can be affected by a fix. For example, using the example analytical AG 600 of FIG. 6, the linked impact count for each of $f_2, f_3, f_4$ with respect to $i_3$ is 2 (accounting for $i_2$ and $i_3$) and the linked impact count for each of $f_2, f_3, f_4$ with respect to $i_2$ is 1, as there is no intermediate impact between each of $f_2, f_3, f_4$ and $i_2$. In some examples, linked impacts can be included in a coverage matrix. For the example analytical attack graph 600 of FIG. 6, an example coverage matrix that includes linked impacts can be provided as:

|   | $f_1$ | $f_2$ | $f_3$ | $f_4$ | $f_5$ | $f_6$ |
|---|---|---|---|---|---|---|
| $i_3$ by $i_1$ | (*, 2) |   |   |   | (*, 1) | (*, 1) |
| $i_3$ by i2 |   | (*, 2) | (*, 2) | (*, 2) | (*, 1) | (*, 1) |
| $i_2$ |   | (*, 1) | (*, 1) | (*, 1) |   |   |
| $i_1$ | (*, 1) |   |   |   |   |   |

In accordance with implementations of the present disclosure, to select between fixes that are equivalent in coverage, the fix with the highest linked impact is selected. However, it can also occur that both coverage and linked impact are equivalent across fixes. This is the case in the example analytical attack graph 600 of FIG. 6 and example coverage matrix above. That is, each of $f_2, f_3, f_4$ have the same coverage and the same linked impact (i.e., 2+1=3). In such instances, and in one example, a fix can be randomly selected from the equivalent fixes. In such instances, and in another example, a fix can be selected from the equivalent fixes based on type (e.g., a permanent fix may be preferable to a temporary fix, or vice-versa). For example, $f_2$ can be selected from the set of $f_2, f_3, f_4$. Subsequently, $f_1$ can be selected as the only remaining choice (e.g., has higher linked impact than either $f_5, f_6$ and provides coverage that $f_5, f_6$ do not).

Accordingly, implementations of the present disclosure enable a solution to be provided in terms of fixes that can be applied to achieve a particular objective (e.g., nullify all impacts, nullify one or more particular impacts). For example, and continuing with the example above, a set of fixes can include $f_1, f_2$ as a solution for nullifying all impacts (e.g., $f_2$ is randomly selected as between $f_2, f_3, f_4$, as described above), a set of fixes can include $f_1$ as a solution for nullifying only $i_1$ and $i_3$ by $i_1$ and a set of fixes can include $f_2$ as a solution for nullifying only $i_2$ (e.g., is randomly selected as between $f_2, f_3, f_4$, as described above).

Implementations of the present disclosure further provide for scheduling remediations. That is, and as described above, the AgiSec platform (e.g., the AgiRem service 210 of FIG. 2) addresses optimization to a set of fixes as an optimized solution for nullifying threats to the enterprise network and (e.g., the AgiPro service 204 of FIG. 2) addresses scheduling of fixes in the set of fixes. For example, the set of fixes represents high priority fixes that can be performed to remediate issues and avoid predicted impacts. However, it can occur that some fixes cannot be applied immediately due to operational constraints and schedules. For example, a server may be indispensable to a process, and cannot be taken offline to apply a fix. Consequently, application of the fix should wait until a maintenance event, in which the server is already scheduled to be offline. In view of such scenarios, implementations of the present disclosure address scheduling of remediations by identifying required fixes and scheduling the fixes based on operational restrictions, if any, and considering the time as a parameter for each fix and adding time to the cost function.

To achieve this, implementations of the present disclosure use multi-objective optimization. More particularly, for a given objective (e.g., avoid $i_j$) there could be multiple sets of fixes, each set of fixes having an associated cost. In some examples, cost is provided in terms of monetary, time, and/or resources (e.g., technical resources required to implement a fix). Both risks and costs are described in further detail in U.S. application Ser. No. 16/554,856, filed on Aug. 29, 2019, and entitled "Generating Attack Graphs in Agile Security Platforms," the disclosure of which is expressly incorporated herein by reference in the entirety for all purposes. In some examples, a first set of fixes may have minimum cost to apply, but is not immediately executable due to some time constraints. In some examples, a second set of fixes may require more cost, but can nullify all issues immediately. As another example, a third set of fixes may be an intermediate solution that has less cost/effort than the second set of fixes, but higher risk than the second set of fixes.

In some implementations, Pareto optimization can be used to select a set of fixes that is to be implemented. In general, Pareto optimization includes a Pareto distribution diagram, or Pareto curve that is based on there being no single solution that fulfills all objectives. Instead, a set of optimal solutions is provided, where each optimal solution optimizes one objective (e.g., minimum cost for remediation). However, each optimal solution does not necessarily provide optimal scheduling to reduce the risk or immediate fixes when compared to another solution in the set of optimal solutions. Consequently, an optimal solution is selected from the set of optimal solutions based on which objective is most important at the time. To address this, a weighted sum can be applied when each objective is given a weight (e.g., 0<=weight<=1) and the sum becomes on objective at the end. In some examples, weights are predefined (e.g., based on expert knowledge). In some implementations, multiple objectives can be combined into a single function. An example function can include:

Minimize[Risk+Cost]

In the example above, the objectives Risk and Cost are likely not on the same scale in terms of units. Consequently, normalization can be applied. Once normalized, the total cost is minimized as the summation of both risk and remediation effort. In some examples, this total cost can be reduced from total benefit to decide whether it is worth spending money for that risk.

In case of optimal remediation, remediation cost and scheduling (e.g., the longer the wait, the higher the monetized risk) can be converted to a single cost function (e.g., currency unit, time unit, resource unit) and minimize the cost (which accounts for the cost of remediation and potential cost for risk). For example, F1, F2, F3 are three different objectives, and a weighted sum can be provided as F=a F1+b F2+c F3. If the objectives are not all ascending or descending functions, then negative values like (–b F2) or reverse value like (b/F2) can be used in the weighted sum.

In accordance with implementations of the present disclosure, a scheduler (e.g., the scheduler 224 of FIG. 2) provides a schedule for executing remediations (fixes). In some examples, the schedule indicates, which fix is to be performed at which time (e.g., $(f_i, t_i)$ where $f_i$ is the $i^{th}$ fix with a cost (weight) $w_i$. Accordingly, given a starting time of $t_0$ (e.g., =0), the optimized solution provided by the scheduler can include one or more sets of pairs indicating remediations to be performed as given times. For example, ($f_1$=close port 80 at machine X, $t_1$=0) (indicating that port 80 of machine X is to be closed immediately), and ($f_2$=install patch on server Y, $t_2$=2) (indicating patch server Y (or a specific service on that machine) no later than 2 days from $t_0$), assuming time is provided in days.

Figure 7:
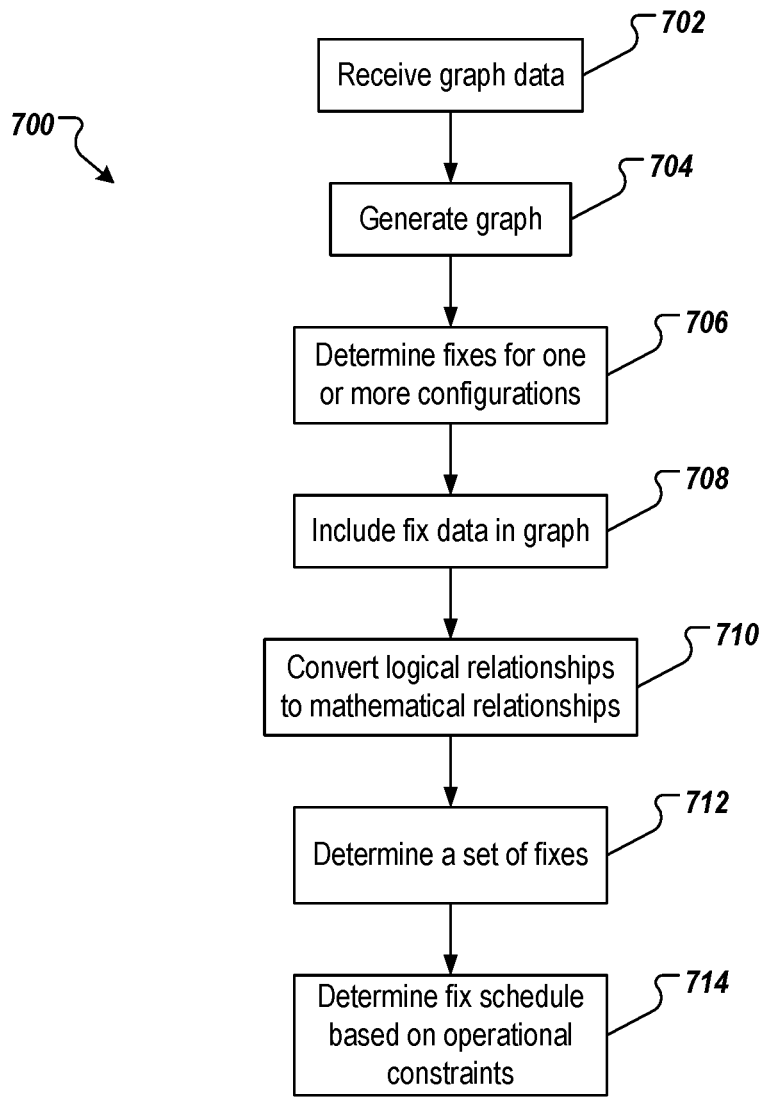
FIG. 7 depicts an example process that can be executed in accordance with implementations of the present disclosure.

FIG. 7 depicts an example process 700 that can be executed in accordance with implementations of the present disclosure. In some implementations, the example process 700 may be performed using one or more computer-executable programs executed using one or more computing devices.

Graph data is received (702). For example, the AgiHack service 208 receives graph data from the AgiDis service 214 of FIG. 2. In some examples, and as described in detail herein, the graph data defines a graph that is representative of an enterprise network. A graph is generated (704). In some examples, and as also described in detail herein, the graph includes nodes and edges between nodes, each node representing an asset within the enterprise network, and each edge representing at least a portion of one or more lateral paths between assets in the enterprise network. In some examples, the graph is provided as an analytical AG, as described herein.

One or more fixes for one or more configurations are determined (706). For example, and as described herein, each configuration represented within the AG is cross-referenced with a threat intelligence knowledge base, which can provide one or more fixes associated with the respective configuration. In some examples, the threat intelligence knowledge base can identify one or more types of fixes for a configuration. Example types of fixes include an official fix (e.g., a fix that wholly resolves a vulnerability), a workaround (e.g., a fix that works around the vulnerability, but does not completely resolve the vulnerability), and a temporary (e.g., a fix that only temporarily resolves a vulnerability). In some examples, a cost is associated with each fix, the cost being provided in terms of monetary, temporal (time), and/or resources (e.g., technical resources required to implement the fix). Fix data is included in graph (708). For example, and as depicted in FIG. 6, fix data can be represented in the AG corresponding to respective configurations. In this manner, coverage of each fix (i.e., one or more impacts the fix affects) can be determined. In some example, a linked impact can be determined for each fix.

Logical relationships are converted to mathematical relationships (710). For example, and as described herein, the AG includes two types of edges: configuration-to-rule edges that represent logical AND (i.e., all configuration conditions have to be true to cause the impact; and rule-to-impact edges that represent logical OR (i.e., the impact happens if at least one rule is satisfied), and a logical OR can be applied for configurations having multiple fixes, such that a single fix is selected from a set of fixes. In some implementations, for fixes, the logical OR is converted to sum (+). In some implementations, for rules and impacts, logical AND is converted to sum (+) and logical OR is converted to multiply (×).

A set of fixes is determined (712). For example, and as described herein, an objective optimization is performed to identify a set of fixes that are determined to be optimal for nullifying one or more impacts. In some implementations, an optimization problem is formulated, as described herein, and one or more resolution tools is implemented to resolve the optimization problem. For example, a greedy algorithm can be used to resolve the optimization problem based on a coverage matrix that represents coverage of respective fixes relative to impacts of the AG. In some examples, the coverage matrix also includes linked impacts for the fixes. A fix schedule is determined for the set of fixes (714). For example, and as described herein, a multi-objective optimization is performed to minimize one or more of Risk and Cost for a given objective (e.g., nullify all impacts, nullify impact $i_j$, nullify impact $i_j$, $i_k$). A schedule is provided, which indicates, for each fix, a time (e.g., time of day and/or date) for implementing the fix.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for applying remediations for cyber security in enterprise networks, the method being executed by one or more processors and comprising:
   providing, by a security platform, graph data defining a graph that is representative of an enterprise network, the graph comprising nodes and edges between nodes, the nodes comprising:
      a set of configuration nodes each representing a condition of an asset of the enterprise network;
      a set of rule nodes each representing an attack methodology; and
      a set of impact nodes each representing an impact on the enterprise network,
      wherein an edge between a configuration node and a rule node indicates that the condition represented by the configuration node enables the attack methodology represented by the rule node, and an edge between a rule node and an impact node indicates that the attack methodology represented by the rule node causes the impact;

identifying, by the security platform, one or more fixes for each of multiple respective conditions represented by configuration nodes of the graph;

incorporating, by the security platform, fix data representative of the identified one or more fixes into the graph, including linking each of the one or more fixes to the configuration node representing the respective condition;

defining, by the security platform and using the graph data, a set of fixes from the identified one or more fixes by executing an optimization problem for nullifying one or more impacts represented by impact nodes of the graph; and scheduling, by the security platform, performance of each fix in the set of fixes.

2. The method of claim 1, wherein each impact comprises an effect on an asset within the enterprise network.

3. The method of claim 1, wherein each fix in the set of fixes has a cost associated therewith, wherein executing the optimization problem comprises optimizing the cost of the set of fixes.

4. The method of claim 3, wherein the cost comprises one or more of a monetary cost, a temporal cost, and a resource cost.

5. The method of claim 1, wherein the optimization problem is executed using a greedy algorithm and a coverage matrix.

6. The method of claim 5, wherein the coverage matrix defines, for each fix of the one or more fixes, one or more impacts that the fix nullifies.

7. The method of claim 6, wherein the coverage matrix further defines, for each fix of the one or more fixes, a linked impact with respect to one or more impacts affected by the fix.

8. The method of claim 1, wherein scheduling, by the security platform, performance of each fix in the set of fixes is executed by performing a multi-objective optimization to minimize one or more of risk and cost for a given objective.

9. The method of claim 8, wherein risk represents a risk of one or more vulnerabilities being exploited over time.

10. The method of claim 1, wherein each fix is one of an official fix that wholly resolves a vulnerability of a configuration, a work-around fix that works around the vulnerability of the configuration, and a temporary fix that only temporarily resolves the vulnerability of the configuration.

11. The method of claim 1, wherein assets comprise one or more of information technology (IT) assets and operational technology (OT) assets.

12. A non-transitory computer-readable storage medium coupled to one or more processors and having instructions stored thereon which, when executed by the one or more processors, cause the one or more processors to perform operations for applying remediations for cyber security in enterprise networks, the operations comprising:

providing, by a security platform, graph data defining a graph that is representative of an enterprise network, the graph comprising nodes and edges between nodes, each node representing an asset within the enterprise network, and each edge representing at least a portion of one or more lateral paths between assets in the enterprise network, the graph data comprising a set of configurations, each configuration affecting at least one impact;

determining, by the security platform, multiple sets of fixes for respective configurations;

incorporating, by the security platform, fix data representative of the multiple sets of fixes into the graph;

defining, by the security platform, a set of fixes comprising one or more fixes from the multiple sets of fixes by executing an optimization problem for nullifying one or more impacts, wherein the optimization problem is executed using a greedy algorithm and a coverage matrix that defines, for each fix in the multiple sets of fixes, one or more impacts that the fix nullifies; and scheduling, by the security platform, performance of each fix in the set of fixes.

13. The non-transitory computer-readable storage medium of claim 12, wherein each impact comprises an effect on an asset within the enterprise network.

14. The non-transitory computer-readable storage medium of claim 12, wherein each fix in the set of fixes has a cost associated therewith, wherein executing the optimization problem comprises optimizing the cost of the set of fixes.

15. The non-transitory computer-readable storage medium of claim 14, wherein the cost comprises one or more of a monetary cost, a temporal cost, and a resource cost.

16. The non-transitory computer-readable storage medium of claim 12, wherein each fix in the set of fixes is associated with a respective configuration in the graph.

17. A system, comprising:

one or more computers; and a computer-readable storage device coupled to the one or more computers and having instructions stored thereon which, when executed by the one or more computers, cause the one or more computers to perform operations for applying remediations for cyber security in enterprise networks, the operations comprising:

providing, by a security platform, graph data defining a graph that is representative of an enterprise network, the graph comprising nodes and edges between nodes, the nodes comprising:

a set of configuration nodes each representing a condition of an asset of the enterprise network;

a set of rule nodes each representing an attack methodology; and a set of impact nodes each representing an impact on the enterprise network, wherein an edge between a configuration node and a rule node indicates that the condition represented by the configuration node enables the attack methodology represented by the rule node, and an edge between a rule node and an impact node indicates that the attack methodology represented by the rule node causes the impact;

identifying, by the security platform, one or more fixes for each of multiple respective conditions represented by configuration nodes of the graph;

incorporating, by the security platform, fix data representative of the identified one or more fixes into the graph, including linking each of the one or more fixes to the configuration node representing the respective condition;

defining, by the security platform and using the graph data, a set of fixes from the identified one or more fixes by executing an optimization problem for nullifying one or more impacts represented by impact nodes of the graph; and scheduling, by the security platform, performance of each fix in the set of fixes.

18. The system of claim 17, wherein:

each fix in the set of fixes has a cost associated therewith, executing the optimization problem comprises optimizing the cost of the set of fixes, and the cost comprises one or more of a monetary cost, a temporal cost, and a resource cost.

19. The system of claim 17, wherein:

the optimization problem is executed using a greedy algorithm and a coverage matrix, the coverage matrix defines, for each fix of the one or more fixes, one or more impacts that the fix nullifies, and the coverage matrix further defines, for each fix of the one or more fixes, a linked impact with respect to one or more impacts affected by the fix.

20. The system of claim 17, wherein scheduling, by the security platform, performance of each fix in the set of fixes is executed by performing a multi-objective optimization to minimize one or more of risk and cost for a given objective, wherein risk represents a risk of one or more vulnerabilities being exploited over time.

* * * * *